United States Patent
Stojancic et al.

(10) Patent No.: US 12,387,493 B2
(45) Date of Patent: *Aug. 12, 2025

(54) MACHINE LEARNING FOR RECOGNIZING AND INTERPRETING EMBEDDED INFORMATION CARD CONTENT

(71) Applicant: STATS LLC, Chicago, IL (US)

(72) Inventors: Mihailo Stojancic, San Jose, CA (US); Warren Packard, Palo Alto, CA (US)

(73) Assignee: STATS LLC, Chicago, IL (US)

( * ) Notice: Subject to any disclaimer, the term of this patent is extended or adjusted under 35 U.S.C. 154(b) by 447 days.

This patent is subject to a terminal disclaimer.

(21) Appl. No.: 17/808,941

(22) Filed: Jun. 24, 2022

(65) Prior Publication Data
US 2022/0327829 A1 Oct. 13, 2022

Related U.S. Application Data

(62) Division of application No. 16/411,710, filed on May 14, 2019, now Pat. No. 11,373,404.

(Continued)

(51) Int. Cl.
*G06V 40/20* (2022.01)
*G06F 16/908* (2019.01)
(Continued)

(52) U.S. Cl.
CPC ............ *G06V 20/42* (2022.01); *G06F 16/908* (2019.01); *G06T 7/12* (2017.01); *G06V 20/41* (2022.01);
(Continued)

(58) Field of Classification Search
CPC ......... G06F 16/908; G06T 2207/20132; G06T 7/12; G06V 20/41; G06V 20/42;
(Continued)

(56) References Cited

U.S. PATENT DOCUMENTS

| | | |
|---|---|---|
| 5,177,931 A | 1/1993 | Latter |
| 5,557,042 A | 9/1996 | Paukkunen et al. |
| | (Continued) | |

FOREIGN PATENT DOCUMENTS

| | | |
|---|---|---|
| CN | 101650722 | 10/2011 |
| CN | 105912560 | 8/2016 |
| | (Continued) | |

OTHER PUBLICATIONS

US 10,462,538 B2, 10/2019, Packard et al. (withdrawn)
(Continued)

*Primary Examiner* — Brandon J Miller
(74) *Attorney, Agent, or Firm* — Bookoff McAndrews PLLC

(57) ABSTRACT

Metadata for highlights of a video stream is extracted from card images embedded in the video stream. The highlights may be segments of a video stream, such as a broadcast of a sporting event, that are of particular interest to one or more users. Card images embedded in video frames of the video stream are identified and processed to extract text. The text characters may be recognized by applying a machine-learned model trained with a set of characters extracted from card images embedded in sports television programming contents. The training set of character vectors may be pre-processed to maximize metric distance between the training set members. The text may be interpreted to obtain the metadata. The metadata may be stored in association with the portion of the video stream. The metadata may provide information regarding the highlights, and may be presented concurrently with playback of the highlights.

17 Claims, 14 Drawing Sheets

Related U.S. Application Data

(60) Provisional application No. 62/746,454, filed on Oct. 16, 2018, provisional application No. 62/712,041, filed on Jul. 30, 2018, provisional application No. 62/680,955, filed on Jun. 5, 2018, provisional application No. 62/673,411, filed on May 18, 2018, provisional application No. 62/673,413, filed on May 18, 2018, provisional application No. 62/673,412, filed on May 18, 2018.

(51) Int. Cl.
| | |
|---|---|
| *G06T 7/12* | (2017.01) |
| *G06V 20/40* | (2022.01) |
| *G06V 20/62* | (2022.01) |
| *G06V 30/148* | (2022.01) |
| *H04N 21/234* | (2011.01) |
| *H04N 21/2343* | (2011.01) |
| *H04N 21/25* | (2011.01) |
| *H04N 21/435* | (2011.01) |
| *H04N 21/44* | (2011.01) |
| *H04N 21/458* | (2011.01) |
| *H04N 21/81* | (2011.01) |
| *H04N 21/84* | (2011.01) |
| *H04N 21/845* | (2011.01) |
| *H04N 21/8549* | (2011.01) |

(52) U.S. Cl.
CPC ............ *G06V 20/46* (2022.01); *G06V 20/48* (2022.01); *G06V 30/153* (2022.01); *G06V 40/20* (2022.01); *H04N 21/435* (2013.01); *H04N 21/44008* (2013.01); *H04N 21/458* (2013.01); *H04N 21/8133* (2013.01); *H04N 21/84* (2013.01); *G06T 2207/20132* (2013.01); *G06V 20/44* (2022.01)

(58) Field of Classification Search
CPC ........ G06V 20/44; G06V 20/46; G06V 20/48; G06V 20/635; G06V 30/153; G06V 40/20; G06V 40/23; H04N 21/23418; H04N 21/234336; H04N 21/251; H04N 21/435; H04N 21/44008; H04N 21/458; H04N 21/8133; H04N 21/84; H04N 21/8549

See application file for complete search history.

(56) References Cited

U.S. PATENT DOCUMENTS

| | | |
|---|---|---|
| 5,681,396 A | 10/1997 | Madanshetty et al. |
| 5,923,607 A | 7/1999 | Suh |
| 5,954,611 A | 9/1999 | Mills et al. |
| 6,005,562 A | 12/1999 | Shiga et al. |
| 6,185,527 B1 | 2/2001 | Petkovic et al. |
| 6,195,458 B1 | 2/2001 | Varnick et al. |
| 6,721,490 B1 | 4/2004 | Yao et al. |
| 7,174,512 B2 | 2/2007 | Martin et al. |
| 7,197,715 B1 | 3/2007 | Valeria |
| 7,386,217 B2 | 6/2008 | Zhang |
| 7,543,322 B1 | 6/2009 | Bhogal et al. |
| 7,633,887 B2 | 12/2009 | Panwar et al. |
| 7,646,962 B1 | 1/2010 | Ellis et al. |
| 7,680,894 B2 | 3/2010 | Diot et al. |
| 7,742,111 B2 | 6/2010 | Shiu et al. |
| 7,774,811 B2 | 8/2010 | Poslinski et al. |
| 7,818,368 B2 | 10/2010 | Yang et al. |
| 7,825,989 B1 | 11/2010 | Greenberg |
| 7,831,112 B2 | 11/2010 | Wang et al. |
| 7,849,487 B1 | 12/2010 | Vosseller |
| 7,929,808 B2 | 4/2011 | Seaman et al. |
| 8,024,753 B1 | 9/2011 | Kummer et al. |
| 8,046,798 B1 | 10/2011 | Schlack et al. |
| 8,079,052 B2 | 12/2011 | Chen et al. |
| 8,099,315 B2 | 1/2012 | Amento |
| 8,103,107 B2 | 1/2012 | Yamamoto |
| 8,104,065 B2 | 1/2012 | Aaby et al. |
| 8,140,570 B2 | 3/2012 | Ingrassia et al. |
| 8,196,168 B1 | 6/2012 | Bryan et al. |
| 8,209,713 B1 | 6/2012 | Lai et al. |
| 8,269,857 B2 | 9/2012 | Ishizaka |
| 8,296,797 B2 | 10/2012 | Olstad et al. |
| 8,296,808 B2 | 10/2012 | Hardacker et al. |
| 8,312,486 B1 | 11/2012 | Briggs et al. |
| 8,320,674 B2 | 11/2012 | Guillou et al. |
| 8,424,041 B2 | 4/2013 | Candelore et al. |
| 8,427,356 B1 | 4/2013 | Satish |
| 8,457,768 B2 | 6/2013 | Hammer et al. |
| 8,522,300 B2 | 8/2013 | Relyea et al. |
| 8,535,131 B2 | 9/2013 | Packard et al. |
| 8,595,763 B1 | 11/2013 | Packard et al. |
| 8,627,349 B2 | 1/2014 | Kirby et al. |
| 8,688,434 B1 | 4/2014 | Birnbaum et al. |
| 8,689,258 B2 | 4/2014 | Kemo |
| 8,702,504 B1 | 4/2014 | Hughes et al. |
| 8,713,008 B2 | 4/2014 | Negi |
| 8,752,084 B1 | 6/2014 | Lai et al. |
| 8,793,579 B2 | 7/2014 | Halliday et al. |
| 8,966,513 B2 | 2/2015 | John et al. |
| 8,973,038 B2 | 3/2015 | Gratton |
| 8,973,068 B2 | 3/2015 | Kotecha et al. |
| 8,990,418 B1 | 3/2015 | Bragg et al. |
| 9,038,127 B2 | 5/2015 | Hastings et al. |
| 9,060,210 B2 | 6/2015 | Packard et al. |
| 9,066,156 B2 | 6/2015 | Kapa |
| 9,213,986 B1 | 12/2015 | Buchheit et al. |
| 9,251,853 B2 | 2/2016 | Jeong et al. |
| 9,253,533 B1 | 2/2016 | Morgan et al. |
| 9,264,779 B2 | 2/2016 | Kirby et al. |
| 9,420,333 B2 | 8/2016 | Martch et al. |
| 9,443,158 B1 | 9/2016 | Haskins |
| 9,451,202 B2 | 9/2016 | Beals |
| 9,565,474 B2 | 2/2017 | Petruzzelli et al. |
| 9,578,377 B1 | 2/2017 | Malik et al. |
| 9,583,149 B2 | 2/2017 | Stieglitz |
| 9,648,379 B2 | 5/2017 | Howcroft |
| 9,715,902 B2 | 7/2017 | Coviello et al. |
| 9,788,062 B2 | 10/2017 | Dimov et al. |
| 9,805,268 B2 | 10/2017 | King et al. |
| 9,888,279 B2 | 2/2018 | Ishtiaq et al. |
| 10,025,986 B1 * | 7/2018 | Grieb ................ G09B 19/0038 |
| 10,056,116 B2 | 8/2018 | Packard et al. |
| 10,250,838 B1 * | 4/2019 | Herz .................... G06V 20/62 |
| 10,297,287 B2 | 5/2019 | Maisenbacher et al. |
| 10,419,830 B2 | 9/2019 | Packard et al. |
| 10,433,030 B2 | 10/2019 | Packard et al. |
| 2001/0013123 A1 | 8/2001 | Freeman et al. |
| 2001/0026609 A1 | 10/2001 | Weinstein et al. |
| 2002/0041752 A1 | 4/2002 | Abiko et al. |
| 2002/0059610 A1 | 5/2002 | Ellis |
| 2002/0067376 A1 | 6/2002 | Martin et al. |
| 2002/0075402 A1 | 6/2002 | Robson et al. |
| 2002/0136528 A1 | 9/2002 | Dagtas |
| 2002/0157095 A1 | 10/2002 | Masumitsu et al. |
| 2002/0157101 A1 | 10/2002 | Schrader et al. |
| 2002/0174430 A1 | 11/2002 | Ellis et al. |
| 2002/0178444 A1 | 11/2002 | Trajkovic et al. |
| 2002/0180774 A1 | 12/2002 | Errico et al. |
| 2002/0194095 A1 | 12/2002 | Koren |
| 2003/0012554 A1 | 1/2003 | Ieidler et al. |
| 2003/0023742 A1 | 1/2003 | Allen et al. |
| 2003/0056220 A1 | 3/2003 | Thornton et al. |
| 2003/0063798 A1 | 4/2003 | Li et al. |
| 2003/0066077 A1 | 4/2003 | Gutta |
| 2003/0118014 A1 | 6/2003 | Iyer et al. |
| 2003/0126605 A1 | 7/2003 | Betz et al. |
| 2003/0126606 A1 | 7/2003 | Buczak et al. |
| 2003/0154475 A1 | 8/2003 | Rodriguez et al. |
| 2003/0172376 A1 | 9/2003 | Coffin |
| 2003/0188317 A1 | 10/2003 | Liew et al. |
| 2003/0189674 A1 | 10/2003 | Inoue et al. |

(56) References Cited

U.S. PATENT DOCUMENTS

| | | |
|---|---|---|
| 2003/0208763 A1 | 11/2003 | McElhatten et al. |
| 2003/0229899 A1 | 12/2003 | Thompson et al. |
| 2004/0003403 A1 | 1/2004 | Marsh |
| 2004/0041831 A1 | 3/2004 | Zhang |
| 2004/0167767 A1 | 8/2004 | Xiong et al. |
| 2004/0181807 A1 | 9/2004 | Theiste et al. |
| 2005/0005308 A1 | 1/2005 | Logan et al. |
| 2005/0015712 A1 | 1/2005 | Plastina |
| 2005/0030977 A1 | 2/2005 | Casey et al. |
| 2005/0044570 A1 | 2/2005 | Poslinski |
| 2005/0071865 A1 | 3/2005 | Martins |
| 2005/0071881 A1 | 3/2005 | Deshpande |
| 2005/0091690 A1 | 4/2005 | Delpuch et al. |
| 2005/0120368 A1 | 6/2005 | Goronzy et al. |
| 2005/0125302 A1 | 6/2005 | Brown et al. |
| 2005/0149965 A1 | 7/2005 | Neogi |
| 2005/0152565 A1 | 7/2005 | Jouppi et al. |
| 2005/0154987 A1 | 7/2005 | Otsuka et al. |
| 2005/0166230 A1 | 7/2005 | Gaydou et al. |
| 2005/0180568 A1 | 8/2005 | Krause |
| 2005/0182792 A1 | 8/2005 | Israel et al. |
| 2005/0191041 A1 | 9/2005 | Braun et al. |
| 2005/0198570 A1 | 9/2005 | Otsuka et al. |
| 2005/0204294 A1 | 9/2005 | Burke |
| 2005/0240961 A1 | 10/2005 | Jerding et al. |
| 2005/0264705 A1 | 12/2005 | Kitamura |
| 2006/0020962 A1 | 1/2006 | Stark et al. |
| 2006/0085828 A1 | 4/2006 | Dureau et al. |
| 2006/0174277 A1 | 8/2006 | Sezan et al. |
| 2006/0190615 A1 | 8/2006 | Panwar et al. |
| 2006/0218573 A1 | 9/2006 | Proebstel |
| 2006/0238656 A1 | 10/2006 | Chen et al. |
| 2006/0253581 A1 | 11/2006 | Dixon et al. |
| 2006/0282852 A1 | 12/2006 | Purpura et al. |
| 2006/0282869 A1 | 12/2006 | Plourde |
| 2007/0033616 A1 | 2/2007 | Gutta |
| 2007/0058930 A1 | 3/2007 | Iwamoto |
| 2007/0083901 A1 | 4/2007 | Bond |
| 2007/0127894 A1 | 6/2007 | Ando et al. |
| 2007/0146554 A1 | 6/2007 | Strickland et al. |
| 2007/0154163 A1 | 7/2007 | Cordray |
| 2007/0154169 A1 | 7/2007 | Cordray et al. |
| 2007/0157235 A1 | 7/2007 | Teunissen |
| 2007/0157249 A1 | 7/2007 | Cordray et al. |
| 2007/0157253 A1 | 7/2007 | Ellis et al. |
| 2007/0157285 A1 | 7/2007 | Frank et al. |
| 2007/0162924 A1 | 7/2007 | Radhakrishnan et al. |
| 2007/0169165 A1 | 7/2007 | Crull et al. |
| 2007/0188655 A1 | 8/2007 | Ohta |
| 2007/0199040 A1 | 8/2007 | Kates |
| 2007/0201764 A1 | 8/2007 | Jung et al. |
| 2007/0204302 A1 | 8/2007 | Calzone |
| 2007/0212023 A1 | 9/2007 | Whitlock |
| 2007/0226766 A1 | 9/2007 | Poslinski et al. |
| 2007/0239856 A1 | 10/2007 | Abadir |
| 2007/0245379 A1 | 10/2007 | Agnihortri |
| 2007/0250777 A1 | 10/2007 | Chen et al. |
| 2007/0288951 A1 | 12/2007 | Ray et al. |
| 2008/0022012 A1 | 1/2008 | Wang |
| 2008/0060006 A1 | 3/2008 | Shanks et al. |
| 2008/0064490 A1 | 3/2008 | Ellis |
| 2008/0086743 A1 | 4/2008 | Cheng et al. |
| 2008/0092168 A1 | 4/2008 | Logan et al. |
| 2008/0097949 A1 | 4/2008 | Kelly et al. |
| 2008/0109307 A1 | 5/2008 | Ullah |
| 2008/0115166 A1 | 5/2008 | Bhogal et al. |
| 2008/0134043 A1 | 6/2008 | Georgis et al. |
| 2008/0155602 A1 | 6/2008 | Collet et al. |
| 2008/0159708 A1 | 7/2008 | Kazama et al. |
| 2008/0163305 A1 | 7/2008 | Johnson et al. |
| 2008/0168503 A1 | 7/2008 | Sparrell |
| 2008/0175486 A1 | 7/2008 | Yamamoto |
| 2008/0178219 A1 | 7/2008 | Grannan |
| 2008/0193016 A1 | 8/2008 | Lim et al. |
| 2008/0195457 A1 | 8/2008 | Sherman et al. |
| 2008/0235348 A1 | 9/2008 | Dasgupta |
| 2008/0239169 A1 | 10/2008 | Moon et al. |
| 2008/0244666 A1 | 10/2008 | Moon et al. |
| 2008/0270038 A1 | 10/2008 | Partovi et al. |
| 2008/0271078 A1 | 10/2008 | Gossweiler et al. |
| 2008/0300982 A1 | 12/2008 | Larson et al. |
| 2008/0303942 A1 | 12/2008 | Chang et al. |
| 2008/0307485 A1 | 12/2008 | Clement et al. |
| 2008/0320523 A1 | 12/2008 | Morris et al. |
| 2009/0025027 A1 | 1/2009 | Craner |
| 2009/0034932 A1 | 2/2009 | Oisel |
| 2009/0055385 A1 | 2/2009 | Jean et al. |
| 2009/0080857 A1 | 3/2009 | St. John-Larkin |
| 2009/0082110 A1 | 3/2009 | Relyea et al. |
| 2009/0102984 A1 | 4/2009 | Mina et al. |
| 2009/0138902 A1 | 5/2009 | Kamen |
| 2009/0144777 A1 | 6/2009 | Mikami et al. |
| 2009/0158357 A1 | 6/2009 | Miller |
| 2009/0178071 A1 | 7/2009 | Whitehead |
| 2009/0210898 A1 | 8/2009 | Childress et al. |
| 2009/0228911 A1 | 9/2009 | Vriisen |
| 2009/0234828 A1 | 9/2009 | Tu |
| 2009/0235313 A1 | 9/2009 | Maruyama et al. |
| 2009/0249412 A1 | 10/2009 | Bhogal et al. |
| 2009/0293093 A1 | 11/2009 | Igarashi |
| 2009/0299824 A1 | 12/2009 | Barnes |
| 2009/0325523 A1 | 12/2009 | Choi |
| 2010/0040151 A1 | 2/2010 | Garrett |
| 2010/0064306 A1 | 3/2010 | Tiongson et al. |
| 2010/0071007 A1 | 3/2010 | Meijer |
| 2010/0071062 A1 | 3/2010 | Choyi et al. |
| 2010/0086277 A1 | 4/2010 | Craner |
| 2010/0089996 A1 | 4/2010 | Koolar |
| 2010/0115554 A1 | 5/2010 | Drouet et al. |
| 2010/0122294 A1 | 5/2010 | Craner |
| 2010/0123830 A1 | 5/2010 | Vunic |
| 2010/0125864 A1 | 5/2010 | Dwyer et al. |
| 2010/0146560 A1 | 6/2010 | Bonfrer |
| 2010/0153856 A1 | 6/2010 | Russ |
| 2010/0153983 A1 | 6/2010 | Phillmon et al. |
| 2010/0153999 A1 | 6/2010 | Yates |
| 2010/0158479 A1 | 6/2010 | Craner |
| 2010/0166389 A1 | 7/2010 | Knee et al. |
| 2010/0169925 A1 | 7/2010 | Takegoshi |
| 2010/0218214 A1 | 8/2010 | Fan et al. |
| 2010/0251295 A1 | 9/2010 | Amento et al. |
| 2010/0251304 A1 | 9/2010 | Donoghue et al. |
| 2010/0251305 A1 | 9/2010 | Kimble et al. |
| 2010/0262986 A1 | 10/2010 | Adimatvam et al. |
| 2010/0269144 A1 | 10/2010 | Forsman et al. |
| 2010/0319019 A1 | 12/2010 | Iazza |
| 2010/0322592 A1 | 12/2010 | Casagrande |
| 2010/0333131 A1 | 12/2010 | Parker et al. |
| 2011/0016492 A1 | 1/2011 | Marita |
| 2011/0016493 A1 | 1/2011 | Lee et al. |
| 2011/0019839 A1 | 1/2011 | Nandury |
| 2011/0052156 A1 | 3/2011 | Kuhn |
| 2011/0072448 A1 | 3/2011 | Stiers et al. |
| 2011/0082858 A1 | 4/2011 | Yu et al. |
| 2011/0096228 A1 | 4/2011 | Deigmoeller et al. |
| 2011/0109801 A1 | 5/2011 | Thomas et al. |
| 2011/0138418 A1 | 6/2011 | Choi et al. |
| 2011/0161242 A1 | 6/2011 | Chung et al. |
| 2011/0173337 A1 | 7/2011 | Walsh et al. |
| 2011/0202956 A1 | 8/2011 | Connelly et al. |
| 2011/0206342 A1 | 8/2011 | Thompson et al. |
| 2011/0212756 A1 | 9/2011 | Packard et al. |
| 2011/0217024 A1 | 9/2011 | Schlieski et al. |
| 2011/0231887 A1 | 9/2011 | West |
| 2011/0239249 A1 | 9/2011 | Murison et al. |
| 2011/0243533 A1 | 10/2011 | Stern et al. |
| 2011/0252451 A1 | 10/2011 | Turgeman et al. |
| 2011/0286721 A1 | 11/2011 | Craner |
| 2011/0289410 A1 | 11/2011 | Paczkowski et al. |
| 2011/0293113 A1 | 12/2011 | McCarthy |
| 2012/0020641 A1 | 1/2012 | Sakaniwa et al. |
| 2012/0047542 A1 | 2/2012 | Lewis et al. |
| 2012/0052941 A1 | 3/2012 | Mo |
| 2012/0060178 A1 | 3/2012 | Minakuchi et al. |

(56) References Cited

U.S. PATENT DOCUMENTS

| | | |
|---|---|---|
| 2012/0082431 A1 | 4/2012 | Sengupta et al. |
| 2012/0106932 A1 | 5/2012 | Grevers, Jr. |
| 2012/0110615 A1 | 5/2012 | Kilar et al. |
| 2012/0110616 A1 | 5/2012 | Kilar et al. |
| 2012/0124625 A1 | 5/2012 | Foote et al. |
| 2012/0131613 A1 | 5/2012 | Ellis et al. |
| 2012/0185895 A1 | 7/2012 | Wong et al. |
| 2012/0204209 A1 | 8/2012 | Kuba |
| 2012/0216118 A1 | 8/2012 | Lin et al. |
| 2012/0230651 A1 | 9/2012 | Chen |
| 2012/0237182 A1 | 9/2012 | Eyer |
| 2012/0246672 A1 | 9/2012 | Sridhar et al. |
| 2012/0260295 A1 | 10/2012 | Rondeau |
| 2012/0263439 A1 | 10/2012 | Lassman et al. |
| 2012/0278834 A1 | 11/2012 | Richardson |
| 2012/0278837 A1 | 11/2012 | Gurtis et al. |
| 2012/0284745 A1 | 11/2012 | Strange |
| 2012/0311633 A1 | 12/2012 | Mandrekar et al. |
| 2012/0324491 A1 | 12/2012 | Bathiche et al. |
| 2013/0014159 A1 | 1/2013 | Wiser et al. |
| 2013/0042179 A1 | 2/2013 | Cormack et al. |
| 2013/0055304 A1 | 2/2013 | Kirby et al. |
| 2013/0061313 A1 | 3/2013 | Cullimore et al. |
| 2013/0073473 A1 | 3/2013 | Heath |
| 2013/0074109 A1 | 3/2013 | Skelton et al. |
| 2013/0114940 A1 | 5/2013 | Merzon et al. |
| 2013/0128119 A1 | 5/2013 | Madathodivil et al. |
| 2013/0138435 A1 | 5/2013 | Weber |
| 2013/0138693 A1 | 5/2013 | Sathish et al. |
| 2013/0145023 A1 | 6/2013 | Li et al. |
| 2013/0160051 A1 | 6/2013 | Armstrong et al. |
| 2013/0174196 A1 | 7/2013 | Herlein |
| 2013/0194503 A1 | 8/2013 | Yamashita |
| 2013/0226983 A1 | 8/2013 | Reining et al. |
| 2013/0251331 A1 | 9/2013 | Sambongi |
| 2013/0263189 A1 | 10/2013 | Garner |
| 2013/0268620 A1 | 10/2013 | Osminer |
| 2013/0268955 A1 | 10/2013 | Conrad et al. |
| 2013/0283162 A1 | 10/2013 | Aronsson et al. |
| 2013/0291037 A1 | 10/2013 | Im et al. |
| 2013/0298146 A1 | 11/2013 | Conrad et al. |
| 2013/0298151 A1 | 11/2013 | Leske et al. |
| 2013/0325869 A1 | 12/2013 | Reiley et al. |
| 2013/0326406 A1 | 12/2013 | Reiley et al. |
| 2013/0326575 A1 | 12/2013 | Robillard et al. |
| 2013/0332962 A1 | 12/2013 | Moritz et al. |
| 2013/0332965 A1 | 12/2013 | Seyller et al. |
| 2013/0346302 A1 | 12/2013 | Purves et al. |
| 2014/0016864 A1 | 1/2014 | Chattopadhyay et al. |
| 2014/0023348 A1 | 1/2014 | O'Kelly et al. |
| 2014/0028917 A1 | 1/2014 | Smith et al. |
| 2014/0032709 A1 | 1/2014 | Saussy et al. |
| 2014/0062696 A1 | 3/2014 | Packard et al. |
| 2014/0067825 A1 | 3/2014 | Oztaskent et al. |
| 2014/0067828 A1 | 3/2014 | Archibong |
| 2014/0067939 A1 | 3/2014 | Packard et al. |
| 2014/0068675 A1 | 3/2014 | Mountain |
| 2014/0068692 A1 | 3/2014 | Archibong et al. |
| 2014/0074866 A1 | 3/2014 | Shah |
| 2014/0082670 A1 | 3/2014 | Papish |
| 2014/0088952 A1 | 3/2014 | Fife et al. |
| 2014/0114647 A1 | 4/2014 | Allen |
| 2014/0114966 A1 | 4/2014 | Bilinski et al. |
| 2014/0123160 A1 | 5/2014 | van Coppenolle et al. |
| 2014/0130094 A1 | 5/2014 | Kirby et al. |
| 2014/0139555 A1 | 5/2014 | Levy |
| 2014/0140680 A1 | 5/2014 | Jo |
| 2014/0150009 A1 | 5/2014 | Sharma |
| 2014/0153904 A1 | 6/2014 | Adimatyam et al. |
| 2014/0157327 A1 | 6/2014 | Roberts et al. |
| 2014/0161417 A1 | 6/2014 | Kurupacheril et al. |
| 2014/0215539 A1 | 7/2014 | Chen et al. |
| 2014/0223479 A1 | 8/2014 | Krishnamoorthi et al. |
| 2014/0282714 A1 | 9/2014 | Hussain |
| 2014/0282741 A1 | 9/2014 | Shoykhet |
| 2014/0282744 A1 | 9/2014 | Hardy et al. |
| 2014/0282745 A1 | 9/2014 | Chipman et al. |
| 2014/0282759 A1 | 9/2014 | Harvey et al. |
| 2014/0282779 A1 | 9/2014 | Navarro |
| 2014/0294201 A1 | 10/2014 | Johnson et al. |
| 2014/0298378 A1 | 10/2014 | Kelley |
| 2014/0310819 A1 | 10/2014 | Cakarel et al. |
| 2014/0313341 A1 | 10/2014 | Stribling |
| 2014/0321831 A1 | 10/2014 | Olsen et al. |
| 2014/0325556 A1 | 10/2014 | Hoang et al. |
| 2014/0331260 A1 | 11/2014 | Gratton |
| 2014/0333841 A1 | 11/2014 | Steck |
| 2014/0351045 A1 | 11/2014 | Abihssira et al. |
| 2014/0373079 A1 | 12/2014 | Friedrich et al. |
| 2015/0003814 A1 | 1/2015 | Miller |
| 2015/0012656 A1 | 1/2015 | Phillips et al. |
| 2015/0020097 A1 | 1/2015 | Freed et al. |
| 2015/0040176 A1 | 2/2015 | Hybertson et al. |
| 2015/0052568 A1 | 2/2015 | Glennon et al. |
| 2015/0054975 A1 | 2/2015 | Emmett et al. |
| 2015/0058890 A1 | 2/2015 | Kapa |
| 2015/0082172 A1 | 3/2015 | Shakib et al. |
| 2015/0095932 A1 | 4/2015 | Ren |
| 2015/0110461 A1 | 4/2015 | Maisenbacher et al. |
| 2015/0110462 A1 | 4/2015 | Maisenbacher et al. |
| 2015/0118992 A1 | 4/2015 | Wyatt et al. |
| 2015/0181132 A1 | 6/2015 | Kummer et al. |
| 2015/0181279 A1 | 6/2015 | Martch et al. |
| 2015/0189377 A1 | 7/2015 | Wheatley et al. |
| 2015/0243326 A1 | 8/2015 | Pacurariu et al. |
| 2015/0249803 A1 | 9/2015 | Tozer et al. |
| 2015/0249864 A1 | 9/2015 | Tang et al. |
| 2015/0281778 A1 | 10/2015 | Khafa et al. |
| 2015/0297949 A1* | 10/2015 | Aman ............... G06T 7/246 348/157 |
| 2015/0310725 A1 | 10/2015 | Koskan et al. |
| 2015/0310894 A1 | 10/2015 | Stieglitz |
| 2015/0319510 A1 | 11/2015 | Ould Dellahy et al. |
| 2015/0334461 A1 | 11/2015 | Yu |
| 2015/0358687 A1 | 12/2015 | Kummer |
| 2015/0358688 A1 | 12/2015 | Kummer |
| 2016/0066020 A1 | 3/2016 | Mountain |
| 2016/0066026 A1 | 3/2016 | Mountain |
| 2016/0066042 A1 | 3/2016 | Dimov et al. |
| 2016/0066049 A1 | 3/2016 | Mountain |
| 2016/0066056 A1 | 3/2016 | Mountain |
| 2016/0073172 A1 | 3/2016 | Sharples |
| 2016/0088351 A1 | 3/2016 | Petruzzelli |
| 2016/0105708 A1 | 4/2016 | Packard et al. |
| 2016/0105733 A1 | 4/2016 | Packard et al. |
| 2016/0105734 A1 | 4/2016 | Packard et al. |
| 2016/0191147 A1 | 6/2016 | Martch |
| 2016/0198229 A1 | 7/2016 | Keipert |
| 2016/0261929 A1 | 9/2016 | Lee et al. |
| 2016/0309212 A1 | 10/2016 | Martch et al. |
| 2017/0017834 A1* | 1/2017 | Sabitov ............... G06V 40/172 |
| 2017/0069159 A1 | 3/2017 | Vikranth et al. |
| 2017/0116466 A1* | 4/2017 | Resnick ............... G06V 20/46 |
| 2017/0347014 A1 | 11/2017 | Chien |
| 2018/0014072 A1 | 1/2018 | Dimov et al. |
| 2018/0020243 A1 | 1/2018 | Ni et al. |
| 2018/0189615 A1* | 7/2018 | Kang ............... G06N 3/08 |
| 2019/0138943 A1* | 5/2019 | Akolkar ............... G06N 5/022 |
| 2019/0205652 A1 | 7/2019 | Ray et al. |
| 2019/0354763 A1 | 11/2019 | Stojancic et al. |
| 2019/0354764 A1 | 11/2019 | Stojancic et al. |

FOREIGN PATENT DOCUMENTS

| | | |
|---|---|---|
| EP | 1469476 | 10/2004 |
| EP | 1865716 | 12/2007 |
| EP | 2902568 | 12/2007 |
| EP | 2107477 | 10/2009 |
| EP | 2309733 | 4/2011 |
| EP | 2403239 | 1/2012 |
| EP | 2464138 | 6/2012 |
| JP | H07160830 A | 6/1995 |
| JP | H1055412 A | 2/1998 |
| JP | 10322622 | 12/1998 |

(56) References Cited

FOREIGN PATENT DOCUMENTS

| | | |
|---|---|---|
| JP | 2001251581 | 9/2001 |
| JP | 2004072540 | 3/2004 |
| JP | 2004260297 | 9/2004 |
| JP | 2005-317165 | 11/2005 |
| JP | 2006211311 | 8/2006 |
| JP | 2006-245745 | 9/2006 |
| JP | 2006333451 | 12/2006 |
| JP | 2007202206 | 8/2007 |
| JP | 2008167019 | 7/2008 |
| JP | 2008176538 A | 7/2008 |
| JP | 2012-029150 | 2/2012 |
| JP | 5034516 | 9/2012 |
| JP | 2013-175854 | 9/2013 |
| JP | 2014-157460 | 8/2014 |
| JP | 2014187687 | 10/2014 |
| JP | 2017-021523 A | 1/2017 |
| JP | 2017097718 A | 6/2017 |
| JP | 2017522648 A | 8/2017 |
| JP | 2018005397 A | 1/2018 |
| KR | 2004-0025073 | 3/2004 |
| KR | 2006-0128295 | 12/2006 |
| WO | WO-9837694 | 8/1998 |
| WO | WO-0243353 | 5/2002 |
| WO | WO-2005059807 | 6/2005 |
| WO | WO-2007064987 | 6/2007 |
| WO | WO-2007098067 | 8/2007 |
| WO | WO-2009073925 | 6/2009 |
| WO | WO-2011040999 | 4/2011 |
| WO | WO-2013016626 | 1/2013 |
| WO | WO-2013166456 | 11/2013 |
| WO | WO-2014072742 | 5/2014 |
| WO | WO-2014164782 | 10/2014 |
| WO | WO-2014179017 | 11/2014 |
| WO | WO-2016030380 | 3/2016 |
| WO | WO-2016030384 | 3/2016 |
| WO | WO-2016030477 | 3/2016 |
| WO | WO-2016033545 | 3/2016 |
| WO | WO-2016034899 | 3/2016 |
| WO | WO-2016055761 | 4/2016 |
| WO | WO-2016057416 | 4/2016 |
| WO | WO-2016057844 | 4/2016 |
| WO | WO-2019222409 | 11/2019 |

OTHER PUBLICATIONS

Extended European Search Report for European Application No. 19 80 3524, mailed Apr. 22, 2022.
BoxtishrTV's API; www_boxfish_com, (retrieved Mar. 28, 2017), 5 pages.
International Search Report for PCT/US2014/060651 dated Jan. 19, 2015 (9 pages).
International Search Report for PCT/US2014/060649 dated Jan. 8, 2015 (9 pages).
Jin, S.H., et al., "Intelligent broadcasting system and services for personalized semantic contents consumption", Experl Systems with Applications, Oxford, GB, vol. 31, No. 1, Jul. 1, 2006, pp. 164-173.
Jin, S.H., et al., "Real-time content filtering for live broadcasts in TV terminals", Multimedia Tools and Applications, Kluwer Academic Publishers, BO, vol. 36, No. 3, Jun. 29, 2007, pp. 285-301.
Thuuz Sports, "Frequently Asked Questions", www.thuuz.com/faq/, (retrieved Mar. 28, 2017), 5 pages.
R. Natarajan et al. "Audio-Based Event Detection in Videos—A Comprehensive Survey", Int. Journal of Engineering and Technology, vol. 6 No. 4 Aug.-Sep. 2014.
Q. Huang et al. Hierarchical Language Modeling for Audio Events Detection in a Sports Game, IEEE International conference on Acoustics, Speech and Signal Processing, 2010.
Q. Huang et al. "Inferring the Structure of a Tennis Game Using Audio Information", IEEE Trans. on Audio Speech and Language Proc., Oct. 2011.
M. Baillie et al. "Audio-based Event Detection for Sports Video", International Conference on Image and Video, CIVR 2003.
Y. Rui et al. "Automatically Extracting Highlights for TV Baseball Programs", Proceedings of the eighth ACM International conference on Multimedia, 2000.
D. A. Sadlier et al. "A Combined Audio-Visual Contribution to Event Detection in Field Sports Broadcast Video. Case Study: Gaelic Football", Proceedings of the 3rd IEEE International Symposium on Signal Processing and Information Technology, Dec. 2003_.
E Kijak et al. "Audiovisual Integration for Tennis Broadcast Structuring", Multimedia Tools and Applications, Springer, vol. 30, Issue 3, pp. 289-311, Sep. 2006.
A. Baijal et al. "Sports Highlights Generation Based on Acoustic Events Detection: A Rugby Case Study", IEEE International Conference on Consumer Electronics (ICCE), pp. 20-23, 2015.
J. Han et al. "A Unified and Efficient Framework for Court-Net Sports Video Analysis Using 3-D Camera Modeling", Proceedings vol. 6506, Multimedia Content Access: Algorithms and Systems; 65060F (2007).
Huang-Chia Shih "A Survey on Content-aware Video Analysis for Sports", IEEE Trans. on Circuits and Systems for Video Technology, vol. 99, No. 9, Jan. 2017.
A. Krizhevslcy et al. "ImageNet Classification with Deep Convolutional Neural Networks", In Proc. NIPS, pp. 10971105, 2012.
D. A. Sadlier et al. Event Detection in Field Sports Video Using Audio—Visual Features and a Support Vector Machine, IEEE Trans. on Circuits and Systems for Video Technology, vol. 15, No. 10, Oct. 2005.
P. F. Felzenszwalb et al. "Efficient Graph-Based Image Segmentation", International Journal of Computer Vision, Sep. 2004, vol. 59, Issue 2, pp. 167-181.
C. J. C. Burges "A Tutorial on Support Vector Machines for Pattern Recognition", Springer, Data Mining and Knowledge Discovery, Jun. 1998, vol. 2, Issue 2, pp. 121-167.
Y.A. LeCun et al. "Efficient BackProp" Neural Networks: Tricks of the Trade. Lecture Notes in Computer Science, vol. 1700, Springer, 2012.
L. Neumann, J. Matas, Real-Time Scene Text Localization and Recognition, 5th IEEE Conference on Computer Vision and Pattern Recognition, Jun. 2012.
R. Smith "An Overview of the Tesseract OCR Engine", International Conference on Document Analysis and Recognition (ICDAR), 2007.
M. Merler, et al., "The Excitement of Sports: Automatic Highlights Using AudioNisual Cues", Dec. 31, 2017, pp. 2520-2523.
H. Harb, et al., Highlights Detection in Sports Videos Based on Audio Analysis, pp. 1-4, Sep. 2009.
J. Ye, et al.• Audio-Based Sports Highlight Detection by Fourier Local-Auto-Correlations, 11th Annual Conference of the International Speech Communication Association, Sep. 2010, pp. 2198-2201.
Miyamori, Hisashi "Automatic Generation of Personalized Digest Based on Context Flow and Distinctive Events", IEICE Technical Report, Jul. 10, 2003, vol. 103, No. 209, pp. 35-40.
Office Action issued in JP Application No. 2020-564734, 15 pages, dated Jun. 22, 2023.
Office Action issued in CN Application No. 201980044176.8, 8 pages, dated Jun. 1, 2023.

\* cited by examiner

MACHINE LEARNING FOR RECOGNIZING AND INTERPRETING EMBEDDED INFORMATION CARD CONTENT

CROSS-REFERENCE TO RELATED APPLICATIONS

The present application is a divisional of U.S. application Ser. No. 16/411,710, for "Machine Learning for Recognizing and Interpreting Embedded Information Card Content" filed May 14, 2019, which claims the benefit of U.S. Provisional Application Ser. No. 62/673,412 for "Machine Learning for Recognizing and Interpreting Embedded Information Card Content", filed May 18, 2018, the content of both of which are incorporated herein by reference in their entireties.

The present application is a divisional of U.S. application Ser. No. 16/411,710, for "Machine Learning for Recognizing and Interpreting Embedded Information Card Content" filed May 14, 2019, which claims the benefit of U.S. Provisional Application Ser. No. 62/673,411 for "Video Processing for Enabling Sports Highlights Generation", filed May 18, 2018, which is incorporated herein by reference in its entirety.

The present application is a divisional of U.S. application Ser. No. 16/411,710, for "Machine Learning for Recognizing and Interpreting Embedded Information Card Content" filed May 14, 2019, which claims the benefit of U.S. Provisional Application Ser. No. 62/673,413 for "Video Processing for Embedded Information Card Localization and Content Extraction", filed May 18, 2018, which is incorporated herein by reference in its entirety.

The present application is a divisional of U.S. application Ser. No. 16/411,710, for "Machine Learning for Recognizing and Interpreting Embedded Information Card Content" filed May 14, 2019, which claims the benefit of U.S. Provisional Application Ser. No. 62/680,955 for "Audio Processing for Detecting Occurrences of Crowd Noise in Sporting Event Television Programming", filed Jun. 5, 2018, which is incorporated herein by reference in its entirety.

The present application is a divisional of U.S. application Ser. No. 16/411,710, for "Machine Learning for Recognizing and Interpreting Embedded Information Card Content" filed May 14, 2019, which claims the benefit of U.S. Provisional Application Ser. No. 62/712,041 for "Audio Processing for Extraction of Variable Length Disjoint Segments from Television Signal", filed Jul. 30, 2018, which is incorporated herein by reference in its entirety.

The present application is a divisional of U.S. application Ser. No. 16/411,710, for "Machine Learning for Recognizing and Interpreting Embedded Information Card Content" filed May 14, 2019, which claims the benefit of U.S. Provisional Application Ser. No. 62/746,454 for "Audio Processing for Detecting Occurrences of Loud Sound Characterized by Short-Time Energy Bursts", filed Oct. 16, 2018, which is incorporated herein by reference in its entirety.

The present application is related to U.S. Utility application Ser. No. 13/601,915 for "Generating Excitement Levels for Live Performances," filed Aug. 31, 2012 and issued on Jun. 16, 2015 as U.S. Pat. No. 9,060,210, which is incorporated by reference herein in its entirety.

The present application is related to U.S. Utility application Ser. No. 13/601,927 for "Generating Alerts for Live Performances," filed Aug. 31, 2012 and issued on Sep. 23, 2014 as U.S. Pat. No. 8,842,007, which is incorporated by reference herein in its entirety.

The present application is related to U.S. Utility application Ser. No. 13/601,933 for "Generating Teasers for Live Performances," filed Aug. 31, 2012 and issued on Nov. 26, 2013 as U.S. Pat. No. 8,595,763, which is incorporated by reference herein in its entirety.

The present application is related to U.S. Utility application Ser. No. 14/510,481 for "Generating a Customized Highlight Sequence Depicting an Event", filed Oct. 9, 2014, which is incorporated by reference herein in its entirety.

The present application is related to U.S. Utility application Ser. No. 14/710,438 for "Generating a Customized Highlight Sequence Depicting Multiple Events", filed May 12, 2015, which is incorporated by reference herein in its entirety.

The present application is related to U.S. Utility application Ser. No. 14/877,691 for "Customized Generation of Highlight Show with Narrative Component", filed Oct. 7, 2015, which is incorporated by reference herein in its entirety.

The present application is related to U.S. Utility application Ser. No. 15/264,928 for "User Interface for Interaction with Customized Highlight Shows", filed Sep. 14, 2016, which is incorporated by reference herein in its entirety.

The present application is related to U.S. Utility application Ser. No. 16/411,704 for "Video Processing for Enabling Sports Highlights Generation", filed on the same date as the present application, which is incorporated by reference herein in its entirety.

The present application is related to U.S. Utility application Ser. No. 16/411,713 for "Video Processing for Embedded Information Card Localization and Content Extraction", filed on the same date as the present application, which is incorporated by reference herein in its entirety.

TECHNICAL FIELD

The present document relates to techniques for identifying multimedia content and associated information on a television device or a video server delivering multimedia content, and enabling embedded software applications to utilize the multimedia content to provide content and services synchronously with delivery of the multimedia content. Various embodiments relate to methods and systems for providing automated video and audio analysis that are used to identify and extract important event-based video segments in sports television video content, to identify video highlights, and to associate metadata with such highlights for pre-game, in-game and post-game review.

DESCRIPTION OF THE RELATED ART

Enhanced television applications such as interactive advertising and enhanced program guides with pre-game, in-game and post-game interactive applications have long been envisioned. Existing cable systems that were originally engineered for broadcast television are being called on to support a host of new applications and services including interactive television services and enhanced (interactive) programming guides.

Some frameworks for enabling enhanced television applications have been standardized. Examples include the OpenCable™ Enhanced TV Application Messaging Specification, as well as the Tru2way specification, which refer to interactive digital cable services delivered over a cable video network and which include features such as interactive program guides, interactive ads, games, and the like. Additionally, cable operator "OCAP" programs provide interactive services such as e-commerce shopping, online banking, electronic program guides, and digital video recording. These efforts have enabled the first generation of video-synchronous applications, synchronized with video content delivered by the programmer/broadcaster, and providing added data and interactivity to television programming.

Recent developments in video/audio content analysis technologies and capable mobile devices have opened up an array of new possibilities in developing sophisticated applications that operate synchronously with live TV programming events. These new technologies and advances in computer vision and video processing, as well as improved computing power of modern processors, allow for real-time generation of sophisticated programming content highlights accompanied by metadata.

SUMMARY

Methods and systems are presented for automatic real time processing of sporting event television programming content for embedded information card localization and embedded text string recognition and interpretation. In at least one embodiment, a machine-learned character classification model is generated based on a training set of characters extracted from a plurality of information cards (card images) embedded in sporting event television programming content. The extracted character images are processed to generate a standardized training set of multidimensional character vectors in a multidimensional vector space. A principal component analysis (PCA) is then performed on this training set, such that orthogonal basis vectors are derived spanning the vector space of the training set.

In at least one embodiment, the dimensionality of the training set vector space is reduced by selecting a limited number of representative orthogonal vectors from the orthogonal basis. A classification model is generated for this specific set of projected alphanumeric characters appearing in embedded information cards by utilizing a machine learning algorithmic structure, which may be a known machine learning algorithm such as a multi-class support vector machines (SVM) or convolutional neural network (CNNs) algorithm.

In at least one embodiment, sporting event television programming content is processed in real-time to extract queries (embedded characters from character strings in information cards), and to set up a query infrastructure with individual character images extracted from embedded character strings. In another embodiment, the individual query images are normalized to generate a query vector for each query character; subsequently, these query vectors are projected onto the orthogonal basis spanning the training vector space to generate projected query vectors. In yet another embodiment, the projected query vectors are recognized (predicted) by applying a previously learned character classification model on each projected query vector. Finally, predicted query characters (forming a predicted character string) are interpreted by meaning extraction. In at least one embodiment, meaning extraction is performed based on the known character string positions in various television programming card image types, as well as based on the knowledge of locations of individual characters within a character string. In at least one embodiment, the extracted information is automatically appended to sporting event metadata associated with the sporting event video highlights.

In at least one embodiment, a method for extracting metadata from a video stream includes storing at least a portion of the video stream, identifying one or more card images embedded in one or more video frames of the portion of the video stream, and subsequently processing the one or more information card images to extract text. In yet another embodiment, the text extracted from the information card images is interpreted to generate and store metadata in association with the portion of the video stream.

In at least one embodiment, the video stream may be a broadcast of a sporting event. The portion of the video stream may be a highlight deemed to be of particular interest to one or more users. The metadata may be descriptive of the highlight.

In at least one embodiment, the method may further include playing the video stream for a user during at least one of identifying the one or more card images, processing the one or more card images, and interpreting the text.

In at least one embodiment, the method may further include playing the highlight for a user and presenting the metadata to the user during playback of the highlight. The metadata may provide real-time information related to the highlight and a timeline of the card images from which the metadata have been obtained.

In at least one embodiment, extracting the text may include identifying one or more character strings within the one or more card images, and recording a location and/or a size of a character image of a card image of the one or more card images that corresponds to each character of the one or more character strings.

In at least one embodiment, extracting the text may further include disambiguating character boundaries of characters of the one or more character strings by performing multiple comparisons of detected character boundaries, and purging the character boundaries that appear too close to each other.

In at least one embodiment, extracting the text may further include performing image validation for characters of the one or more character strings by establishing a contrast ratio between low and high intensity pixel counts.

In at least one embodiment, interpreting the text may include generating queries based on the text, generating n-dimensional query feature vectors, projecting the n-dimensional query feature vectors onto a training set orthogonal basis, applying the projected n-dimensional query feature vectors to a classification model to produce predicted queries, and extracting meaning of the text from the predicted queries.

In at least one embodiment, the method may further include generating training set feature vectors, and using the training set feature vectors to derive the training set orthogonal basis.

In at least one embodiment, the method may further include generating training set feature vectors, and using the training set feature vectors and derived training set orthogonal basis vectors to generate the classification model.

In at least one embodiment, interpreting the text may further include using at least two selections from the group consisting of a string length of one or more character strings within the text, a position of character boundaries and/or characters within the text, and a horizontal position of character boundaries and/or characters within the text.

In at least one embodiment, storing the metadata in association with the portion of the video stream may include storing a video frame number of the one or more video frames, associated with queries.

In at least one embodiment, interpreting the text may include ascertaining field positions of characters of one or more character strings of the text, ascertaining alphanumeric values of the characters, and using the field positions and alphanumeric values to sequentially interpret the one or more character strings.

In at least one embodiment, interpreting the text may further include obtaining positional and other information regarding one or more card fields of each of the card images, and using the positional and other information to compensate for one or more possible missing front characters of the one or more character strings.

In at least one embodiment, a method for generating a character recognition and classification model is described in relation to the automatic video highlight generation. The method includes extracting and storing at least a portion of the video stream for which automatic highlight metadata is to be generated, identifying one or more information card images embedded in one or more video frames of the portion of the video stream, and processing the one or more information card images to extract a plurality of character images. The method further includes generating training feature vectors associated with the plurality of character images, processing the training feature vectors, using at least some of the training feature vectors to train a character recognition and classification model, and subsequently storing the processed training set and the classification model. The training feature vectors may be processed in a manner that increases uniqueness of the training feature vectors by increasing mutual metric distance of the training feature vectors, and/or by reducing dimensionality of an overall vector space containing the training feature vectors.

In at least one embodiment, the method may further include prior to generating the training feature vectors, normalizing the character images to a standard size and/or a standard illumination.

In at least one embodiment, generating the training feature vectors may include formatting a set of n pixels extracted from the character images into n-dimensional vectors.

In at least one embodiment, the method may further include performing a principal component analysis on the training feature vectors. Using at least some of the training feature vectors to train the classification model may include selecting a subset of the training feature orthogonal basis vectors, and using the subset of the orthogonal basis vectors to train the character recognition and classification model.

In at least one embodiment, the orthogonal basis vectors may span the overall training feature vector space. Reducing a dimensionality of the overall training feature vector space may include selecting a limited number of the orthogonal basis vectors which represent the said training feature vector space sufficiently accurately. Reducing the dimensionality of the overall training vector space may include selecting only orthogonal basis vectors that correspond to a set of largest singular values derived from a matrix of the orthogonal basis vectors. Storing the classification model may include storing a limited number of the orthogonal basis vectors for subsequent use in classification model generation and/or query processing. Generating the classification model may include using a limited number of the training set orthogonal basis vectors in conjunction with a machine learning algorithm selected from the group consisting of SVM and CNN.

In at least one embodiment, the method may further include processing the one or more information card images to extract text, interpreting the text to obtain metadata, and storing the metadata in association with the portion of the video stream. The method further includes playing the portion of the video stream for a user, and presenting the metadata to the user during playback of the portion of the video stream. The video stream may be a broadcast of a sporting event. The portion of the video stream may include a highlight deemed to be of particular interest to one or more users. The metadata may be descriptive of the highlight.

In at least one embodiment, extracting the text may include extracting text strings of the text as queries.

In at least one embodiment, extracting the text may include extracting at least one of a current time within the sporting event, a current phase of the sporting event, a game clock pertaining to the sporting event, and a game score pertaining to the sporting event.

Further details and variations are described herein.

BRIEF DESCRIPTION OF THE DRAWINGS

The accompanying drawings, together with the description, illustrate several embodiments. One skilled in the art will recognize that the particular embodiments illustrated in the drawings are merely exemplary, and are not intended to limit scope.

DETAILED DESCRIPTION

Definitions

Figure 1A:
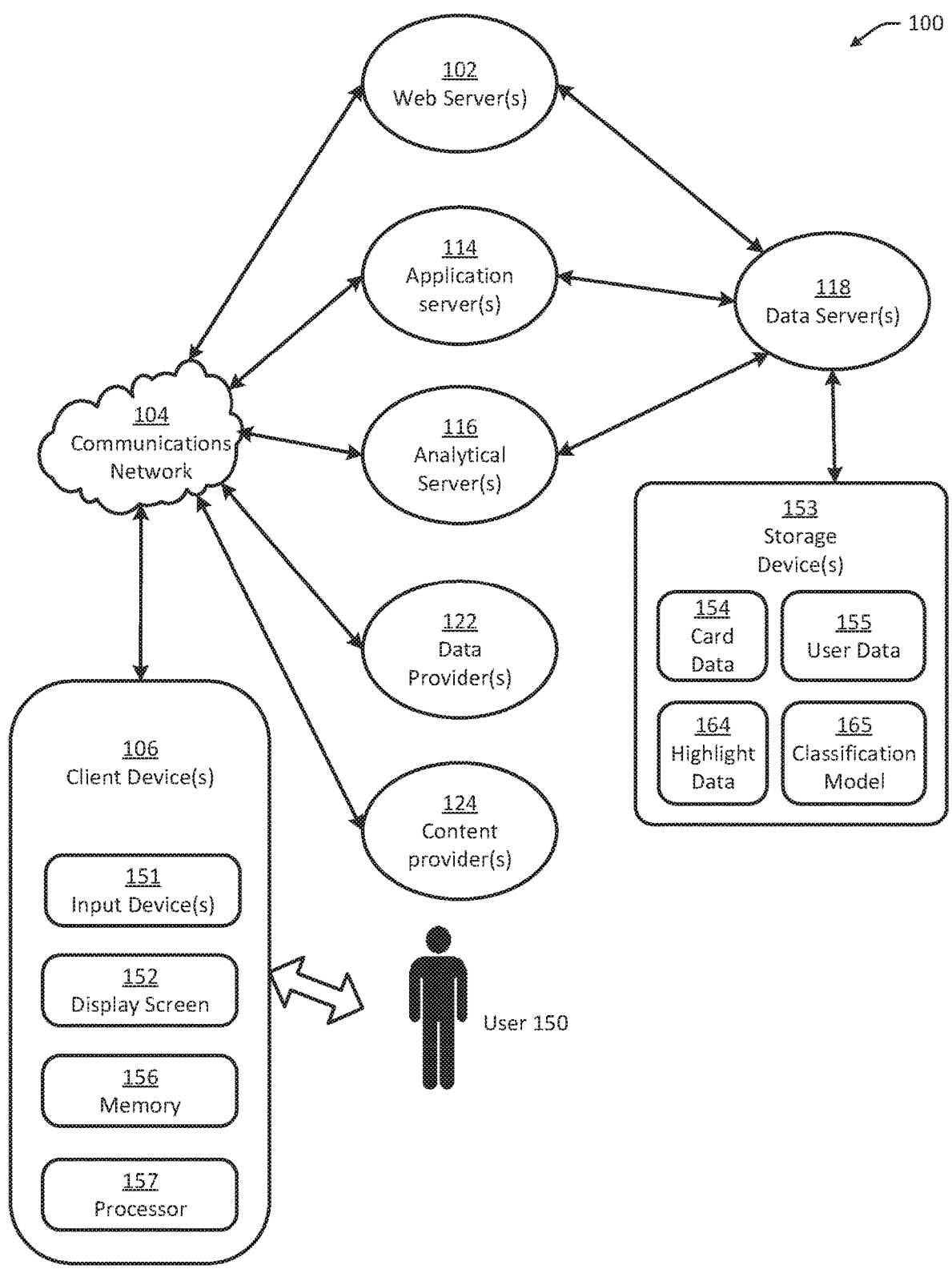
FIG. 1A is a block diagram depicting a hardware architecture according to a client/server embodiment, wherein event content is provided via a network-connected content provider.

The following definitions are presented for explanatory purposes only, and are not intended to limit scope.

Event: For purposes of the discussion herein, the term "event" refers to a game, session, match, series, performance, program, concert, and/or the like, or portion thereof (such as an act, period, quarter, half, inning, scene, chapter, or the like). An event may be a sporting event, entertainment event, a specific performance of a single individual or subset of individuals within a larger population of participants in an event, or the like. Examples of non-sporting events include television shows, breaking news, socio-political incidents, natural disasters, movies, plays, radio shows, podcasts, audiobooks, online content, musical performances, and/or the like. An event can be of any length. For illustrative purposes, the technology is often described herein in terms of sporting events; however, one skilled in the art will recognize that the technology can be used in other contexts as well, including highlight shows for any audiovisual, audio, visual, graphics-based, interactive, non-interactive, or text-based content. Thus, the use of the term "sporting event" and any other sports-specific terminology in the description is intended to be illustrative of one possible embodiment, but is not intended to restrict the scope of the described technology to that one embodiment. Rather, such terminology should be considered to extend to any suitable non-sporting context as appropriate to the technology. For ease of description, the term "event" is also used to refer to an account or representation of an event, such as an audiovisual recording of an event, or any other content item that includes an accounting, description, or depiction of an event.

Highlight: An excerpt or portion of an event, or of content associated with an event, that is deemed to be of particular interest to one or more users. A highlight can be of any length. In general, the techniques described herein provide mechanisms for identifying and presenting a set of customized highlights (which may be selected based on particular characteristics and/or preferences of the user) for any suitable event. "Highlight" can also be used to refer to an account or representation of a highlight, such as an audiovisual recording of a highlight, or any other content item that includes an accounting, description, or depiction of a highlight. Highlights need not be limited to depictions of events themselves, but can include other content associated with an event. For example, for a sporting event, highlights can include in-game audio/video, as well as other content such as pre-game, in-game, and post-game interviews, analysis, commentary, and/or the like. Such content can be recorded from linear television (for example, as part of the video stream depicting the event itself), or retrieved from any number of other sources. Different types of highlights can be provided, including for example, occurrences (plays), strings, possessions, and sequences, all of which are defined below. Highlights need not be of fixed duration, but may incorporate a start offset and/or end offset, as described below.

Content Delineator: One or more video frames that indicate the start or end of a highlight.

Occurrence: Something that takes place during an event. Examples include: a goal, a play, a down, a hit, a save, a shot on goal, a basket, a steal, a snap or attempted snap, a near-miss, a fight, a beginning or end of a game, quarter, half, period, or inning, a pitch, a penalty, an injury, a dramatic incident in an entertainment event, a song, a solo, and/or the like. Occurrences can also be unusual, such as a power outage, an incident with an unruly fan, and/or the like. Detection of such occurrences can be used as a basis for determining whether or not to designate a particular portion of a video stream as a highlight. Occurrences are also referred to herein as "plays", for ease of nomenclature, although such usage should not be construed to limit scope. Occurrences may be of any length, and the representation of an occurrence may be of varying length. For example, as mentioned above, an extended representation of an occurrence may include footage depicting the period of time just before and just after the occurrence, while a brief representation may include just the occurrence itself. Any intermediate representation can also be provided. In at least one embodiment, the selection of a duration for a representation of an occurrence can depend on user preferences, available time, determined level of excitement for the occurrence, importance of the occurrence, and/or any other factors.

Offset: The amount by which a highlight length is adjusted. In at least one embodiment, a start offset and/or end offset can be provided, for adjusting start and/or end times of the highlight, respectively. For example, if a highlight depicts a goal, the highlight may be extended (via an end offset) for a few seconds so as to include celebrations and/or fan reactions following the goal. Offsets can be configured to vary automatically or manually, based for example on amount of time available for the highlight, importance and/or excitement level of the highlight, and/or any other suitable factors.

String: A series of occurrences that are somehow linked or related to one another. The occurrences may take place within a possession (defined below), or may span multiple possessions. The occurrences may take place within a sequence (defined below), or may span multiple sequences. The occurrences can be linked or related because of some thematic or narrative connection to one another, or because one leads to another, or for any other reason. One example of a string is a set of passes that lead to a goal or basket. This is not to be confused with a "text string," which has the meaning ordinarily ascribed to it in the computer programming arts.

Possession: Any time-delimited portion of an event. Demarcation of start/end times of a possession can depend on the type of event. For certain sporting events wherein one team may be on the offensive while the other team is on the defensive (such as basketball or football, for example), a possession can be defined as a time period while one of the teams has the ball. In sports such as hockey or soccer, where puck or ball possession is more fluid, a possession can be considered to extend to a period of time wherein one of the teams has substantial control of the puck or ball, ignoring momentary contact by the other team (such as blocked shots or saves). For baseball, a possession is defined as a half-inning. For football, a possession can include a number of sequences in which the same team has the ball. For other types of sporting events as well as for non-sporting events, the term "possession" may be somewhat of a misnomer, but is still used herein for illustrative purposes. Examples in a non-sporting context may include a chapter, scene, act, television segment, or the like. For example, in the context of a music concert, a possession may equate to performance of a single song. A possession can include any number of occurrences.

Sequence: A time-delimited portion of an event that includes one continuous time period of action. For example, in a sporting event, a sequence may begin when action begins (such as a face-off, tipoff, or the like), and may end when the whistle is blown to signify a break in the action. In a sport such as baseball or football, a sequence may be equivalent to a play, which is a form of occurrence. A sequence can include any number of possessions, or may be a portion of a possession.

Highlight show: A set of highlights that are arranged for presentation to a user. The highlight show may be presented linearly (such as a video stream), or in a manner that allows the user to select which highlight to view and in which order (for example by clicking on links or thumbnails). Presentation of highlight show can be non-interactive or interactive, for example allowing a user to pause, rewind, skip, fast-forward, communicate a preference for or against, and/or the like. A highlight show can be, for example, a condensed game. A highlight show can include any number of contiguous or non-contiguous highlights, from a single event or from multiple events, and can even include highlights from different types of events (e.g. different sports, and/or a combination of highlights from sporting and non-sporting events).

User/viewer: The terms "user" or "viewer" interchangeably refer to an individual, group, or other entity that is watching, listening to, or otherwise experiencing an event, one or more highlights of an event, or a highlight show. The terms "user" or "viewer" can also refer to an individual, group, or other entity that may at some future time watch, listen to, or otherwise experience either an event, one or more highlights of an event, or a highlight show. The term "viewer" may be used for descriptive purposes, although the event need not have a visual component, so that the "viewer" may instead be a listener or any other consumer of content.

Narrative: A coherent story that links a set of highlight segments in a particular order.

Excitement level: A measure of how exciting or interesting an event or highlight is expected to be for a particular user or for users in general. Excitement levels can also be determined with respect to a particular occurrence or player. Various techniques for measuring or assessing excitement level are discussed in the above-referenced related applications. As discussed, excitement level can depend on occurrences within the event, as well as other factors such as overall context or importance of the event (playoff game, pennant implications, rivalries, and/or the like). In at least one embodiment, an excitement level can be associated with each occurrence, string, possession, or sequence within an event. For example, an excitement level for a possession can be determined based on occurrences that take place within that possession. Excitement level may be measured differently for different users (e.g. a fan of one team vs. a neutral fan), and it can depend on personal characteristics of each user.

Metadata: Data pertaining to and stored in association with other data. The primary data may be media such as a sports program or highlight.

Card Image: An image in a video frame that provides data regarding anything depicted in the video, such as an event, a depiction of an event, or a portion thereof. Exemplary card images contain game scores, game clocks, and/or other statistics from sporting events. Card images may appear temporarily or for the full duration of a video stream; those that appear temporarily may pertain particularly to the portion of a video stream in which they appear.

Character Image: A portion of an image that is believed to pertain to a single character. The character image may include the region surrounding the character. For example, a character image may include a generally rectangular bounding box surrounding a character.

Character: A symbol that can be part of a word, number, or representation of a word or number. Characters can include letters, numbers, and special characters, and may be in any language.

Character String: A set of characters that is grouped together in a manner indicating that they pertain to a single piece of information, such as the name of the team playing in a sporting event. An English language character string will often be arranged horizontally and read left-to-right. However, character strings may be arranged differently in English and in other languages.

Overview

According to various embodiments, methods and systems are provided for automatically creating time-based metadata associated with highlights of television programming of a sporting event. The highlights and associated in-frame time-based information may be extracted synchronously with respect to the television broadcast of a sporting event, or while the sporting event video content is being streamed via a video server from a backup device after the television broadcast of a sporting event.

In at least one embodiment, a software application operates synchronously with playback and/or receipt of the television programming content to provide information metadata associated with content highlights. Such software can run, for example, on the television device itself, or on an associated set-top box (STB), or on a video server with the capability of receiving and subsequently streaming programming content, or on a mobile device equipped with the capability of receiving a video feed including live programming. In at least one embodiment, the highlights and associated metadata application operate synchronously with television programming content presentation.

Interactive television applications can enable timely, relevant presentation of highlighted television programming content to users who are watching television programming either on a primary television display, or on a secondary display such as a tablet, laptop, or smartphone. A set of video clips representing television broadcast content highlights may be generated and/or stored in real-time, along with a database containing time-based metadata describing in more detail the events presented by highlight video clips.

The metadata accompanying video clips can be any information such as textual information, a set of images, and/or any type of audiovisual data. One type of metadata associated with in-game and post-game video content highlights carries real-time information about sporting game parameters extracted directly from live programming content by reading information cards ("card images") embedded in one or more of video frames of the programming content. In at least one embodiment, the described system and method enable this type of automatic metadata generation, thus associating the card image content with video highlights of the analyzed digital video stream.

In various embodiments, an automated process is described, including: receiving a digital video stream, analyzing one or more video frames of the digital video stream for the presence and extraction of card images, localizing text boxes within the card images, and recognizing and interpreting strings of characters residing within the text boxes.

The automated metadata generation video system presented herein may receive a live broadcast video stream or a digital video streamed via a computer server, and may process the video stream in real-time using computer vision and machine learning techniques to extract metadata from embedded information cards.

In at least one embodiment, character strings associated with the extracted information card text fields are identified, and the location and size of the image of each character in the string of characters are recorded. Subsequently, any number of characters in text strings from various fields of the information card are recognized and text strings with recognized characters are interpreted, providing real-time information related to the sporting event television programming, such as current time and phase of the game, game score, play information, and/or the like.

In another embodiment, individual character images are extracted from embedded character strings, and subsequently used to generate normalized query vectors. These normalized query vectors are then projected onto the orthogonal basis spanning the training vector space, said training vectors previously assembled and used to train a machine learning classifier such as, for example, a multi-class support vector machine (SVM) classifier (e.g. C. BURGES, "A Tutorial on Support Vector Machines for Pattern Recognition", Kluwer Academic Publishers, 1998). Projected queries are subsequently used to generate query predictions as an output of a pre-trained classification model produced by exemplary SVM training mechanisms. It should be noted that classification models are not limited to the SVM-based models. Classification models may be also produced using other techniques, such as convolutional neural networks (CNNs), and with a multitude of variations in CNN algorithmic mechanisms (e.g. Y. LeCun at al., "Efficient NN Back Propagation", Springer 1998) suitable to the training data set presented herein.

In yet another embodiment, query character predictions are generated by applying projected query character vectors against a previously developed, machine learned classification model. In this step, a string of predicted characters is generated in accordance with previously established classification labels, and the predicted strings of alphanumeric characters are passed to a recognition and interpretation process. The query recognition and interpretation process applies previous knowledge and positional understanding of characters residing in a multitude of information card fields. The meaning of each predicted alphanumeric character, positioned in a particular group of characters, is further interpreted, and the derived information is appended to the video highlight metadata handled by the video highlight generation application.

In yet another embodiment, a character classification model generation is considered, wherein the model is based on a training set of characters extracted from any number of information cards embedded in sporting event television programming content. Character bounding boxes are detected, and characters are extracted from a multitude of information cards. These character images are subsequently normalized to a standardized size and illumination, to form a descriptor associated with each particular character from a set of alphanumeric characters appearing in embedded information cards. In this manner, each extracted character image represents an n-dimensional vector in a multidimensional vector space containing the training set of vectors. The n-dimensional training vectors, representing the set of character images, are further processed to increase uniqueness and mutual metric distance, as well as to reduce the dimensionality of the overall vector space of training vectors.

In at least one embodiment, a principal component analysis (e.g. G. Golub and F. Loan, "Matrix Computations", Johns Hopkins Univ. Press, Baltimore, 1989) is performed on the training vector set. Thus, an orthogonal basis of vectors is devised from the training set, such that the orthogonal basis vectors span the training set vector space. In addition, the dimensionality of the training set vector space is reduced by selecting a limited number of orthogonal basis vectors such that only the most important orthogonal vectors, associated with the largest set of singular values, generated by singular value decomposition of the training set matrix of basis vectors, are retained. Subsequently, the selected training set basis vectors are saved for later use in classification model generation with one or more of available algorithmic structures for data set classification, such as a multi-class SVM-based classifier, or a CNN-based classifier.

System Architecture

According to various embodiments, the system can be implemented on any electronic device, or set of electronic devices, equipped to receive, store, and present information. Such an electronic device may be, for example, a desktop computer, laptop computer, television, smartphone, tablet, music player, audio device, kiosk, set-top box (STB), game system, wearable device, consumer electronic device, and/or the like.

Although the system is described herein in connection with an implementation in particular types of computing devices, one skilled in the art will recognize that the techniques described herein can be implemented in other contexts, and indeed in any suitable device capable of receiving and/or processing user input, and presenting output to the user. Accordingly, the following description is intended to illustrate various embodiments by way of example, rather than to limit scope.

Referring now to FIG. 1A, there is shown a block diagram depicting hardware architecture of a system 100 for automatically extracting metadata from card images embedded in a video stream of an event, according to a client/server embodiment. Event content, such as the video stream, may be provided via a network-connected content provider 124. An example of such a client/server embodiment is a web-based implementation, wherein each of one or more client devices 106 runs a browser or app that provides a user interface for interacting with content from various servers 102, 114, 116, including data provider(s) servers 122, and/or content provider(s) servers 124, via communications network 104. Transmission of content and/or data in response to requests from client device 106 can take place using any known protocols and languages, such as Hypertext Markup Language (HTML), Java, Objective C, Python, JavaScript, and/or the like.

Client device 106 can be any electronic device, such as a desktop computer, laptop computer, television, smartphone, tablet, music player, audio device, kiosk, set-top box, game system, wearable device, consumer electronic device, and/or the like. In at least one embodiment, client device 106 has a number of hardware components well known to those skilled in the art. Input device(s) 151 can be any component(s) that receive input from user 150, including, for example, a handheld remote control, keyboard, mouse, stylus, touch-sensitive screen (touchscreen), touchpad, gesture receptor, trackball, accelerometer, five-way switch, microphone, or the like. Input can be provided via any suitable mode, including for example, one or more of: pointing, tapping, typing, dragging, gesturing, tilting, shaking, and/or speech. Display screen 152 can be any component that graphically displays information, video, content, and/or the like, including depictions of events, highlights, and/or the like. Such output may also include, for example, audiovisual content, data visualizations, navigational elements, graphical elements, queries requesting information and/or parameters for selection of content, or the like. In at least one embodiment, where only some of the desired output is presented at a time, a dynamic control, such as a scrolling mechanism, may be available via input device(s) 151 to choose which information is currently displayed, and/or to alter the manner in which the information is displayed.

Processor 157 can be a conventional microprocessor for performing operations on data under the direction of software, according to well-known techniques. Memory 156 can be random-access memory, having a structure and architecture as are known in the art, for use by processor 157 in the course of running software for performing the operations described herein. Client device 106 can also include local storage (not shown), which may be a hard drive, flash drive, optical or magnetic storage device, web-based (cloud-based) storage, and/or the like.

Any suitable type of communications network 104, such as the Internet, a television network, a cable network, a cellular network, and/or the like can be used as the mechanism for transmitting data between client device 106 and various server(s) 102, 114, 116 and/or content provider(s) 124 and/or data provider(s) 122, according to any suitable protocols and techniques. In addition to the Internet, other examples include cellular telephone networks, EDGE, 3G, 4G, long term evolution (LTE), Session Initiation Protocol (SIP), Short Message Peer-to-Peer protocol (SMPP), SS7, Wi-Fi, Bluetooth, ZigBee, Hypertext Transfer Protocol (HTTP), Secure Hypertext Transfer Protocol (SHTTP), Transmission Control Protocol/Internet Protocol (TCP/IP), and/or the like, and/or any combination thereof. In at least one embodiment, client device 106 transmits requests for data and/or content via communications network 104, and receives responses from server(s) 102, 114, 116 containing the requested data and/or content.

In at least one embodiment, the system of FIG. 1A operates in connection with sporting events; however, the teachings herein apply to nonsporting events as well, and it is to be appreciated that the technology described herein is not limited to application to sporting events. For example, the technology described herein can be utilized to operate in connection with a television show, movie, news event, game show, political action, business show, drama, and/or other episodic content, or for more than one such event.

In at least one embodiment, system 100 identifies highlights of broadcast events by analyzing a video stream of the event. This analysis may be carried out in real-time. In at least one embodiment, system 100 includes one or more web server(s) 102 coupled via a communications network 104 to one or more client devices 106. Communications network 104 may be a public network, a private network, or a combination of public and private networks such as the Internet. Communications network 104 can be a LAN, WAN, wired, wireless and/or combination of the above. Client device 106 is, in at least one embodiment, capable of connecting to communications network 104, either via a wired or wireless connection. In at least one embodiment, client device may also include a recording device capable of receiving and recording events, such as a DVR, PVR, or other media recording device. Such recording device can be part of client device 106, or can be external; in other embodiments, such recording device can be omitted. Although FIG. 1A shows one client device 106, system 100 can be implemented with any number of client device(s) 106 of a single type or multiple types.

Web server(s) 102 may include one or more physical computing devices and/or software that can receive requests from client device(s) 106 and respond to those requests with data, as well as send out unsolicited alerts and other messages. Web server(s) 102 may employ various strategies for fault tolerance and scalability such as load balancing, caching and clustering. In at least one embodiment, web server(s) 102 may include caching technology, as known in the art, for storing client requests and information related to events.

Web server(s) 102 may maintain, or otherwise designate, one or more application server(s) 114 to respond to requests received from client device(s) 106. In at least one embodiment, application server(s) 114 provide access to business logic for use by client application programs in client device(s) 106. Application server(s) 114 may be co-located, co-owned, or co-managed with web server(s) 102. Application server(s) 114 may also be remote from web server(s) 102. In at least one embodiment, application server(s) 114 interact with one or more analytical server(s) 116 and one or more data server(s) 118 to perform one or more operations of the disclosed technology.

One or more storage devices 153 may act as a "data store" by storing data pertinent to operation of system 100. This data may include, for example, and not by way of limitation, card data 154 pertinent to card images embedded in video streams presenting events such as sporting events, user data 155 pertinent to one or more users 150, highlight data 164 pertinent to one or more highlights of the events, and/or a classification model 165, which may be used to predict and/or extract text from card data 154.

Card data 154 can include any information related to card images embedded in the video stream, such as the card images themselves, subsets thereof such as character images, text extracted from the card images such as characters and character strings, and attributes of any of the foregoing that can be helpful in text and/or meaning extraction. User data 155 can include any information describing one or more users 150, including for example, demographics, purchasing behavior, video stream viewing behavior, interests, preferences, and/or the like. Highlight data 164 may include highlights, highlight identifiers, time indicators, categories, excitement levels, and other data pertaining to highlights. Classification model 165 may include machine trained classification model, queries, query feature vectors, training set orthogonal bases, predicted queries, extracted text meaning, and/or other information that facilitates extraction of text and/or meaning from card data 154. Card data 154, user data 155, highlight data 164, and classification model 165 will be described in detail subsequently.

Notably, many components of system 100 may be, or may include, computing devices. Such computing devices may each have an architecture similar to that of the client device 106, as shown and described above. Thus, any of communications network 104, web servers 102, application servers 114, analytical servers 116, data providers 122, content providers 124, data servers 118, and storage devices 153 may include one or more computing devices, each of which may optionally have an input device 151, display screen 152, memory 156, and/or a processor 157, as described above in connection with client devices 106.

In an exemplary operation of system 100, one or more users 150 of client devices 106 view content from content providers 124, in the form of video streams. The video streams may show events, such as sporting events. The video streams may be digital video streams that can readily be processed with known computer vision techniques.

As the video streams are displayed, one or more components of system 100, such as client devices 106, web servers 102, application servers 114, and/or analytical servers 116, may analyze the video streams, identify highlights within the video streams, and/or extract metadata from the video stream, for example, from embedded card images and/or other aspects of the video stream. This analysis may be carried out in response to receipt of a request to identify highlights and/or metadata for the video stream. Alternatively, in another embodiment, highlights may be identified without a specific request having been made by user 150. In yet another embodiment, the analysis of video streams can take place without a video stream being displayed.

In at least one embodiment, user 150 can specify, via input device(s) 151 at client device 106, certain parameters for analysis of the video stream (such as, for example, what event/games/teams to include, how much time user 150 has available to view the highlights, what metadata is desired, and/or any other parameters). User preferences can also be extracted from storage, such as from user data 155 stored in one or more storage devices 153, so as to customize analysis of the video stream without necessarily requiring user 150 to specify preferences. In at least one embodiment, user preferences can be determined based on observed behavior and actions of user 150, for example, by observing website visitation patterns, television watching patterns, music listening patterns, online purchases, previous highlight identification parameters, highlights and/or metadata actually viewed by user 150, and/or the like.

Additionally or alternatively, user preferences can be retrieved from previously stored preferences that were explicitly provided by user 150. Such user preferences may indicate which teams, sports, players, and/or types of events are of interest to user 150, and/or they may indicate what type of metadata or other information related to highlights, would be of interest to user 150. Such preferences can therefore be used to guide analysis of the video stream to identify highlights and/or extract metadata for the highlights.

Analytical server(s) 116, which may include one or more computing devices as described above, may analyze live and/or recorded feeds of play-by-play statistics related to one or more events from data provider(s) 122. Examples of data provider(s) 122 may include, but are not limited to, providers of real-time sports information such as STATS™, Perform (available from Opta Sports of London, UK), and SportRadar of St. Gallen, Switzerland. In at least one embodiment, analytical server(s) 116 generate different sets of excitement levels for events; such excitement levels can then be stored in conjunction with highlights identified by system 100 according to the techniques described herein.

Application server(s) 114 may analyze the video stream to identify the highlights and/or extract the metadata. Additionally or alternatively, such analysis may be carried out by client device(s) 106. The identified highlights and/or extracted metadata may be specific to a user 150; in such case, it may be advantageous to identify the highlights in client device 106 pertaining to a particular user 150. Client device 106 may receive, retain, and/or retrieve the applicable user preferences for highlight identification and/or metadata extraction, as described above. Additionally or alternatively, highlight generation and/or metadata extraction may carried out globally (i.e., using objective criteria applicable to the user population in general, without regard to preferences for a particular user 150). In such a case, it may be advantageous to identify the highlights and/or extract the metadata in application server(s) 114.

Content that facilitates highlight identification and/or metadata extraction may come from any suitable source, including from content provider(s) 124, which may include websites such as YouTube, MLB.com, and the like; sports data providers; television stations; client- or server-based DVRs; and/or the like. Alternatively, content can come from a local source such as a DVR or other recording device associated with (or built into) client device 106. In at least one embodiment, application server(s) 114 generate a customized highlight show, with highlights and metadata, available to user 150, either as a download, or streaming content, or on-demand content, or in some other manner.

As mentioned above, it may be advantageous for user-specific highlight identification and/or metadata extraction to be carried out at a particular client device 106 associated with a particular user 150. Such an embodiment may avoid the need for video content or other high-bandwidth content to be transmitted via communications network 104 unnecessarily, particularly if such content is already available at client device 106.

Figure 1B:
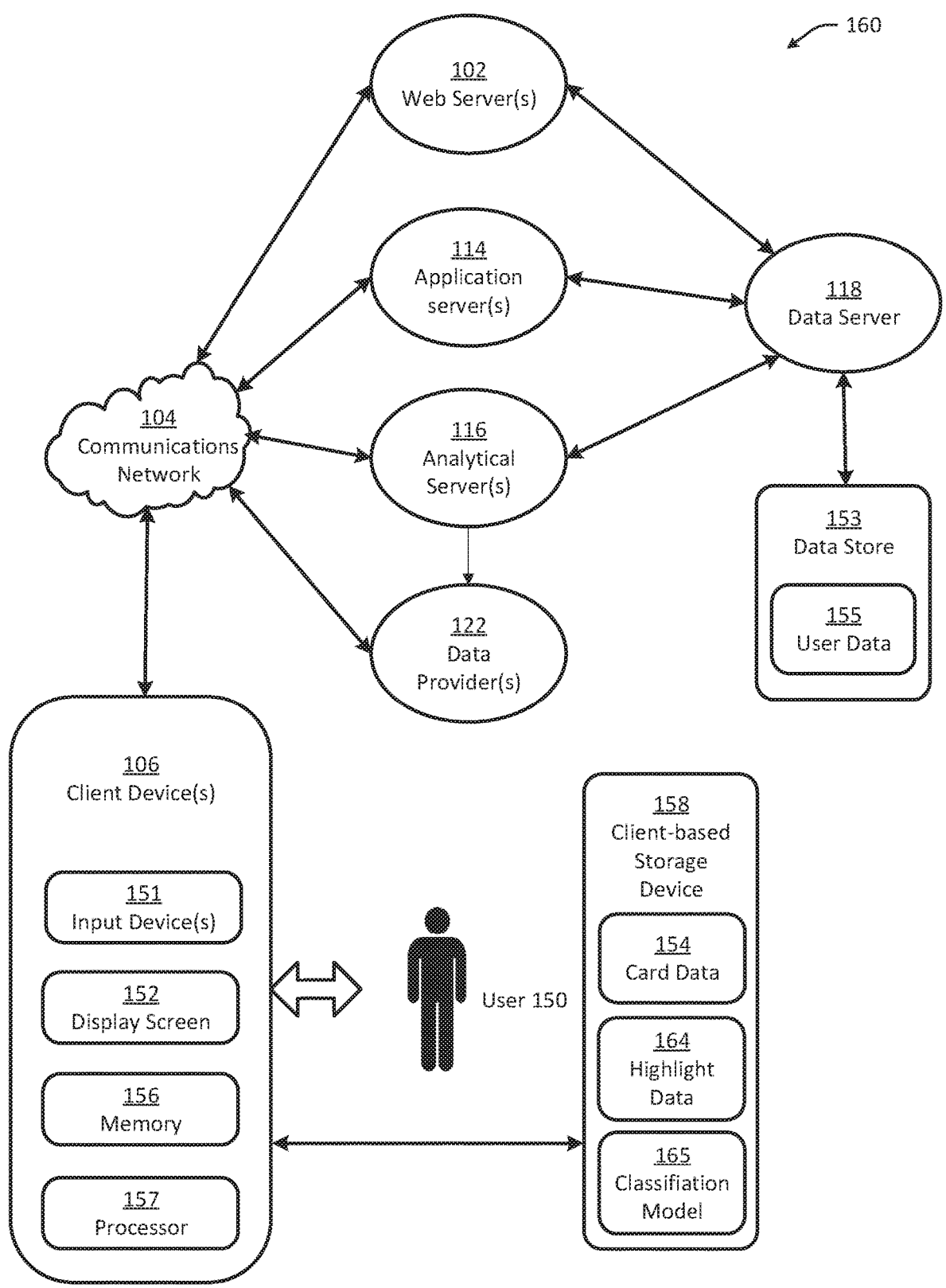
FIG. 1B is a block diagram depicting a hardware architecture according to another client/server embodiment, wherein event content is stored at a client-based storage device.

For example, referring now to FIG. 1B, there is shown an example of a system 160 according to an embodiment wherein at least some of the card data 154, highlight data 164, and classification model 165 are stored at client-based storage device 158, which may be any form of local storage device available to client device 106. An example is a DVR on which events may be recorded, such as for example video content for a complete sporting event. Alternatively, client-based storage device 158 can be any magnetic, optical, or electronic storage device for data in digital form; examples include flash memory, magnetic hard drive, CD-ROM, DVD-ROM, or other device integrated with client device 106 or communicatively coupled with client device 106. Based on the information provided by application server(s) 114, client device 106 may extract metadata from card data 154 stored at client-based storage device 158 and store the metadata as highlight data 164 without having to retrieve other content from a content provider 124 or other remote source. Such an arrangement can save bandwidth, and can usefully leverage existing hardware that may already be available to client device 106.

Returning to FIG. 1A, in at least one embodiment, application server(s) 114 may identify different highlights and/or extract different metadata for different users 150, depending on individual user preferences and/or other parameters. The identified highlights and/or extracted metadata may be presented to user 150 via any suitable output device, such as display screen 152 at client device 106. If desired, multiple highlights may be identified and compiled into a highlight show, along with associated metadata. Such a highlight show may be accessed via a menu, and/or assembled into a "highlight reel," or set of highlights, that plays for the user 150 according to a predetermined sequence. User 150 can, in at least one embodiment, control highlight playback and/or delivery of the associated metadata via input device(s) 151, for example to:

select particular highlights and/or metadata for display;
pause, rewind, fast-forward;
skip forward to the next highlight;
return to the beginning of a previous highlight within the highlight show; and/or
perform other actions.

Additional details on such functionality are provided in the above-cited related U.S. patent applications.

In at least one embodiment, one more data server(s) 118 are provided. Data server(s) 118 may respond to requests for data from any of server(s) 102, 114, 116, for example to obtain or provide card data 154, user data 155, highlight data 164, and/or the classification model 165. In at least one embodiment, such information can be stored at any suitable storage device 153 accessible by data server 118, and can come from any suitable source, such as from client device 106 itself, content provider(s) 124, data provider(s) 122, and/or the like.

Figure 1C:
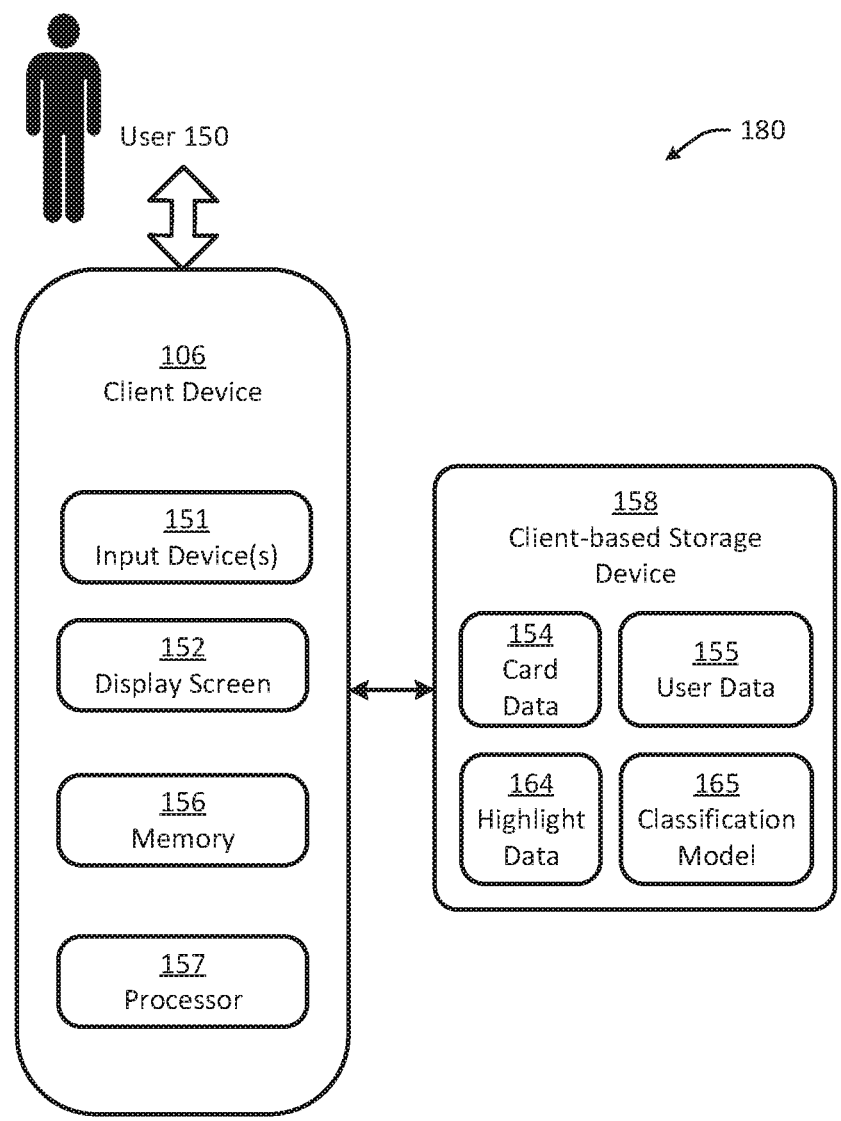
FIG. 1C is a block diagram depicting a hardware architecture according to a standalone embodiment.

Referring now to FIG. 1C, there is shown a system 180 according to an alternative embodiment wherein system 180 is implemented in a stand-alone environment. As with the embodiment shown in FIG. 1B, at least some of the card data 154, user data 155, highlight data 164, and classification model 165 may be stored at a client-based storage device 158, such as a DVR or the like. Alternatively, client-based storage device 158 can be flash memory or a hard drive, or other device integrated with client device 106 or communicatively coupled with client device 106.

User data 155 may include preferences and interests of user 150. Based on such user data 155, system 180 may extract metadata within card data 154 to present to user 150 in the manner described herein. Additionally or alternatively, metadata may be extracted based on objective criteria that are not based on information specific to user 150.

Figure 1D:
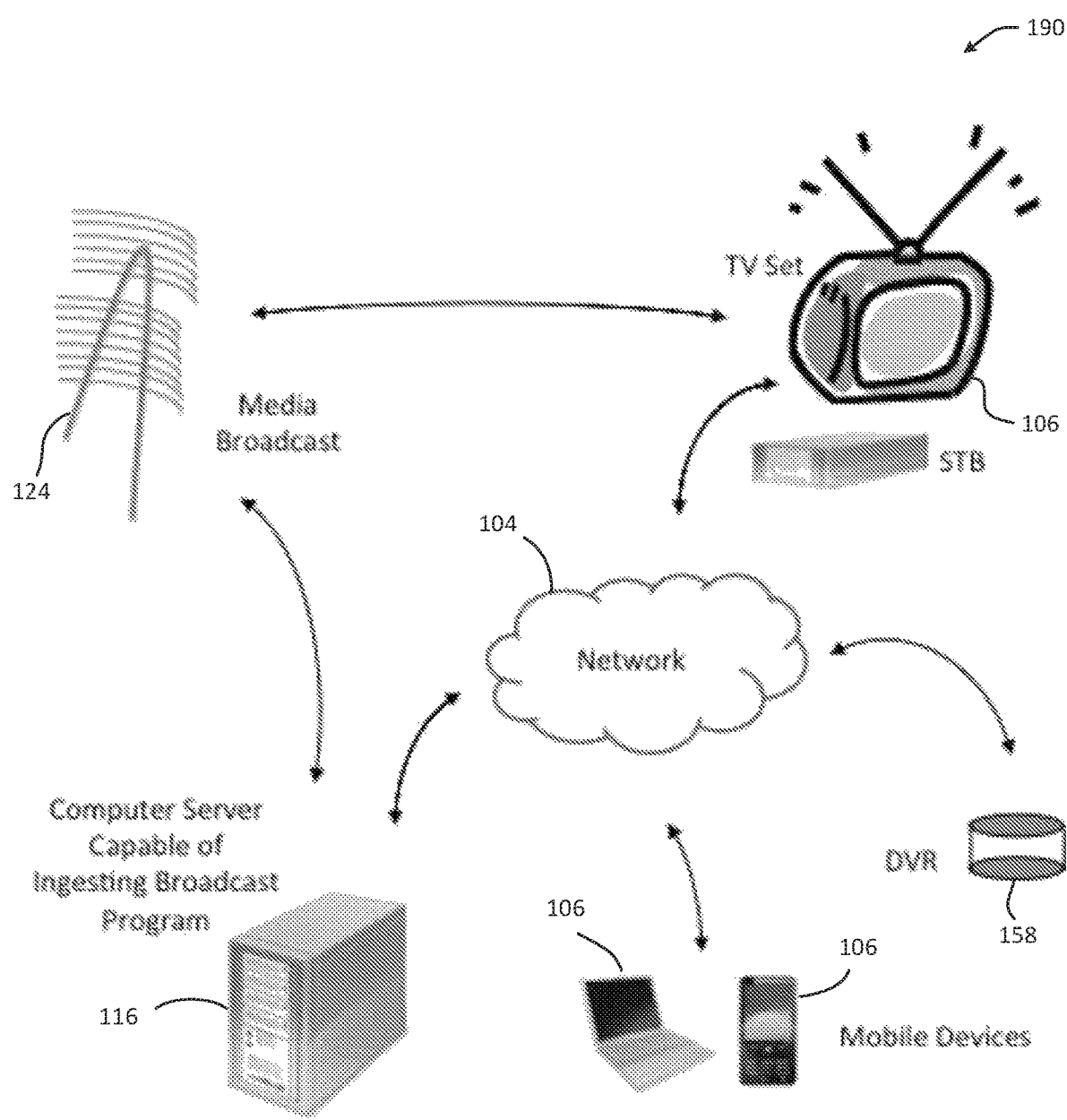
FIG. 1D is a block diagram depicting an overview of a system architecture, according to one embodiment.

Referring now to FIG. 1D, there is shown an overview of a system 190 with architecture according to an alternative embodiment. In FIG. 1D, the system 190 includes a broadcast service such as content provider(s) 124, a content receiver in the form of client device 106 such as a television set with a STB, a video server such as analytical server(s) 116 capable of ingesting and streaming television programming content, and/or other client devices 106 such as a mobile device and a laptop, which are capable of receiving and processing television programming content, all connected via a network such as communications network 104. A client-based storage device 158, such as a DVR, may be connected to any of client devices 106 and/or other components, and may store a video stream, highlights, highlight identifiers, and/or metadata to facilitate identification and presentation of highlights and/or extracted metadata via any of client devices 106.

The specific hardware architectures depicted in FIGS. 1A, 1B, 1C, and 1D are merely exemplary. One skilled in the art will recognize that the techniques described herein can be implemented using other architectures. Many components depicted therein are optional and may be omitted, consolidated with other components, and/or replaced with other components.

In at least one embodiment, the system can be implemented as software written in any suitable computer programming language, whether in a standalone or client/server architecture. Alternatively, it may be implemented and/or embedded in hardware.

Data Structures

Figure 2:
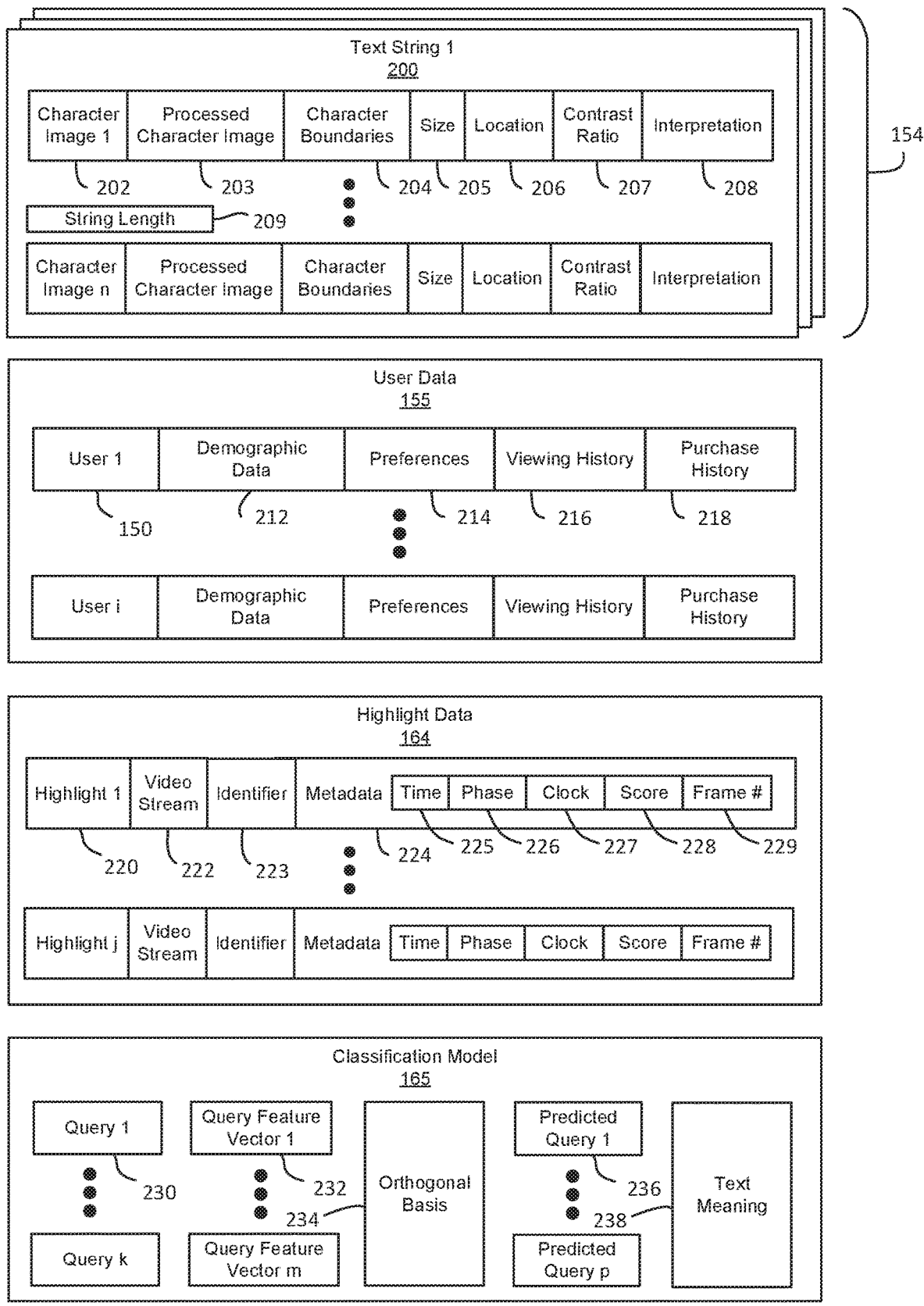
FIG. 2 is a schematic block diagram depicting examples of data structures that may be incorporated into the card images, user data, highlight data, and classification model, according to one embodiment.

FIG. 2 is a schematic block diagram depicting examples of data structures that may be incorporated into card data 154, user data 155, highlight data 164, and classification model 165, according to one embodiment.

As shown, card data 154 may include a record for each of a plurality of card images embedded in one or more video streams. Each of the card images may contain one or more character strings 200. Each of the character strings 200 may have records for n characters. Each such record may have a character image 202, a processed character image 203, character boundaries 204, a size 205, a location 206, a contrast ratio 207, and/or an interpretation 208. Each of the character strings 200 may further have a string length 209, indicating the length of the character string 200 (for example, in characters, pixels, or the like).

Character image 202 may be the particular portion of the card image that contains a single character. Processed character image 203 may be character image 202 after application of one or more processing steps, such as normalization for size, brightness, and/or the like.

Character boundaries 204 may indicate the boundaries of character image 202, processed character image 203, and/or the character represented in character image 202 and processed character image 203.

Size 205 may be the size of character image 202, processed character image 203, and/or the character represented in character image 202 and processed character image 203, for example, in pixels.

Location 206 may be the position of character image 202, processed character image 203, and/or the character represented in character image 202 and processed character image 203 within the card image. In some examples, location 206 may indicate position in two dimensions (for example, x and y coordinates of a corner or center of character image 202, processed character image 203, and/or the character represented in character image 202 and processed character image 203).

Contrast ratio 207 may be an indicator of contrast of character image 202, processed character image 203, and/or the character represented in character image 202 and processed character image 203. In some examples, contrast ratio 207 may be the ratio of luminance values of one or more brightest pixels, to that of one or more darkest pixels, within character image 202, processed character image 203, and/or the character represented in character image 202 and processed character image 203.

Interpretation 208 may be the specific character, for example, a, b, c, 1, 2, 3, #, &, etc., believed to be represented in character image 202 after some analysis has been performed to interpret character string 200.

The structure of card data 154 set forth in FIG. 2 is merely exemplary; in some embodiments, data pertinent to card images embedded in a video stream may be organized differently. For example, in other embodiments, each character string may not necessarily be broken down into individual character images. Rather, character strings may be interpreted as a whole, and data useful to interpretation of the character string may be stored for the entire character string. Further, in alternative embodiments, data not specifically described above may be incorporated into card data 154. The structures of user data 155, highlight data 164, and classification model 165 of FIG. 2 are likewise merely exemplary; many alternatives may be envisioned by a person of skill in the art.

As further shown, user data 155 may include records pertaining to users 150, each of which may include demographic data 212, preferences 214, viewing history 216, and purchase history 218 for a particular user 150.

Demographic data 212 may include any type of demographic data, including but not limited to age, gender, location, nationality, religious affiliation, education level, and/or the like.

Preferences 214 may include selections made by user 150 regarding his or her preferences. Preferences 214 may relate directly to highlight and metadata gathering and/or viewing, or may be more general in nature. In either case, preferences 214 may be used to facilitate identification and/or presentation of the highlights and metadata to user 150.

Viewing history 216 may list the television programs, video streams, highlights, web pages, search queries, sporting events, and/or other content retrieved and/or viewed by the user 150.

Purchase history 218 may list products or services purchased or requested by user 150.

As further shown, highlight data 164 may include records for j highlights 220, each of which may include a video stream 222, an identifier, and/or metadata 224 for a particular highlight 220.

Video stream 222 may include video depicting highlight 220, which may be obtained from one or more video streams of one or more events (for example, by cropping the video stream to include only video stream 222 pertaining to highlight 220). Identifier 223 may include time codes and/or other indicia that indicate where highlight 220 resides within the video stream of the event from which it is obtained.

In some embodiments, the record for each of highlights 220 may contain only one of video stream 222 and identifier 223. Highlight playback may be carried out by playing video stream 222 for user 150, or by using identifier 223 to play only the highlighted portion of the video stream for the event from which the highlight 220 is obtained.

Metadata 224 may include information about highlight 220, such as the event date, season, and groups or individuals involved in the event or the video stream from which highlight 220 was obtained, such as teams, players, coaches, anchors, broadcasters, and fans, and/or the like. Among other information, metadata 224 for each highlight 220 may include a time 225, phase 226, clock 227, score 228, and/or frame number 229.

Time 225 may be a time, within video stream 222, from which highlight 220 is obtained, or within video stream 222 pertaining to highlight 220, at which metadata is available. In some examples, time 225 may be the playback time, within video stream 222, pertaining to highlight 220, at which a card image is displayed containing metadata 224.

Phase 226 may be the phase of the event pertaining to highlight 220. More particularly, phase 226 may be the stage of a sporting event at which the card image is displayed containing metadata 224. For example, phase 226 may be "third quarter," "second inning," "bottom half," or the like.

Clock 227 may be the game clock pertaining to highlight 220. More particularly, clock 227 may be state of the game clock at the time the card image is displayed containing metadata 224. For example, clock 227 may be "15:47" for a card image displayed with fifteen minutes and forty-seven seconds displayed on the game clock.

Score 228 may be the game score pertaining to highlight 220. More particularly, score 228 may be the score when the card image is displayed containing metadata 224. For example, score 228 may be "45-38," "7-0," "30-love," or the like.

Frame number 229 may be the number of the video frame, within the video stream from which highlight 220 is obtained, or video stream 222 pertaining to highlight 220, that relates most directly to highlight 220. More particularly, frame number 229 may be the number of such a video frame at which the card image is displayed containing metadata 224.

As shown further, classification model 165 may include a variety of information that facilitates extraction and interpretation of character strings 200. This, in turn, may enable automated generation of metadata 224 for highlights 220. Specifically, classification model 165 may include queries 230, query feature vectors 232, orthogonal basis 234, predicted queries 236, and/or text meaning 238.

The operation of queries 230, query feature vectors 232, orthogonal basis 234, and predicted queries 236 are set forth in greater detail herein. Text meaning 238 may be the interpretation of character strings 200, rendered in a manner that can be easily copied into metadata 224.

The data structures set forth in FIG. 2 are merely exemplary. Those of skill in the art will recognize that some of the data of FIG. 2 may be omitted or replaced with other data in the performance of highlight identification and/or metadata extraction. Additionally or alternatively, data not shown in FIG. 2 may be used in the performance of highlight identification and/or metadata extraction.

Card Images

Figure 3:
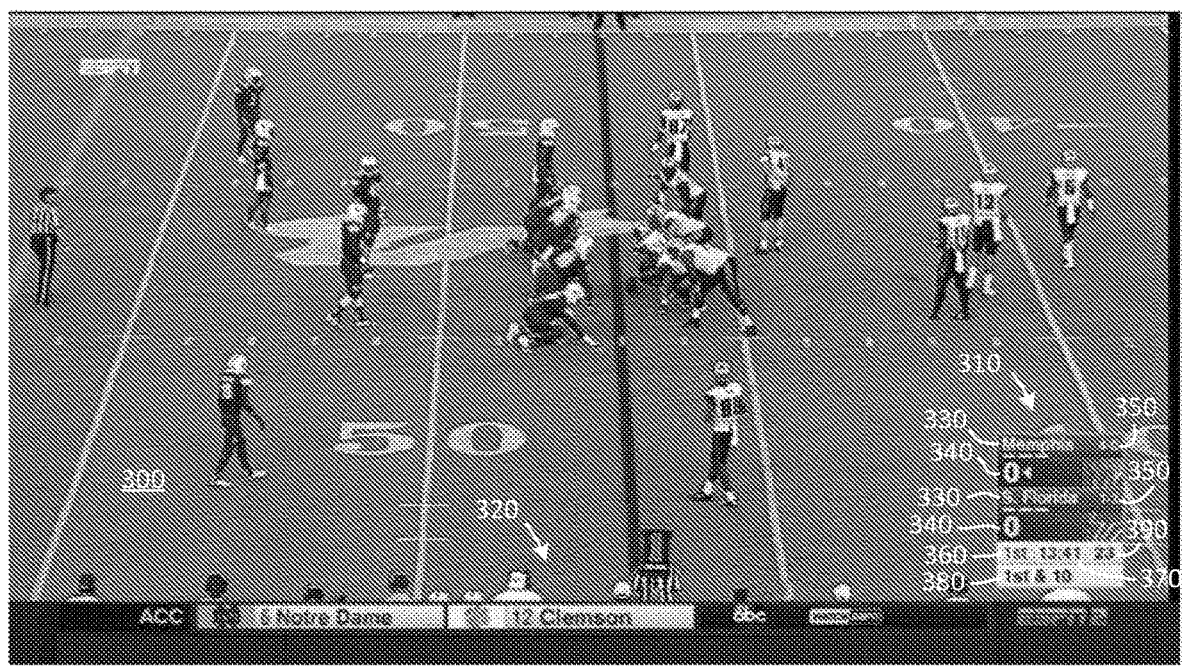
FIG. 3 is a screenshot diagram of an example of a video frame from a video stream, showing in-frame embedded information card images as may be found in sporting event television programming contents.

Referring now to FIG. 3, there is shown a screenshot diagram of an example of a video frame 300 from a video stream with embedded information in the form of card images, as may frequently appear in sporting event television programming. FIG. 3 depicts a card image 310 in the lower right-hand side of video frame 300, and a second card image 320 extending along the bottom of video frame 300. Card images 310, 320 may contain embedded information such as the game phase, current clocks, and current scores.

In at least one embodiment, the information in card images 310, 320 is localized and processed for automatic recognition and interpretation of embedded text in card images 310, 320. The interpreted text may then be assembled into textual metadata describing the status of the sporting game at particular point of time within the sporting event timeline.

Notably, card image 310 may pertain to the sporting event currently being shown, while second card image 320 may contain information for a different sporting event. In some embodiments, only card images containing information deemed to be pertinent to the currently playing sporting event is processed for metadata generation. Thus, without limiting scope, the exemplary description below assumes that only card image 310 will be processed. However, in alternative embodiments, it may be desirable to process multiple card images in a given video frame 300, even including card images pertaining to other sporting events.

As shown in FIG. 3, card image 310 can provide several different types of metadata 224, including team names 330, scores 340, prior team performance 350, a current game stage 360, a game clock 370, a play status 380, and/or other information 390. Each of these may be extracted from within card image 310 and interpreted to provide metadata 224 corresponding to highlight 220 containing video frame 300, and more particularly, to video frame 300 in which card image 310 is displayed.

Metadata Extraction

Figure 4:
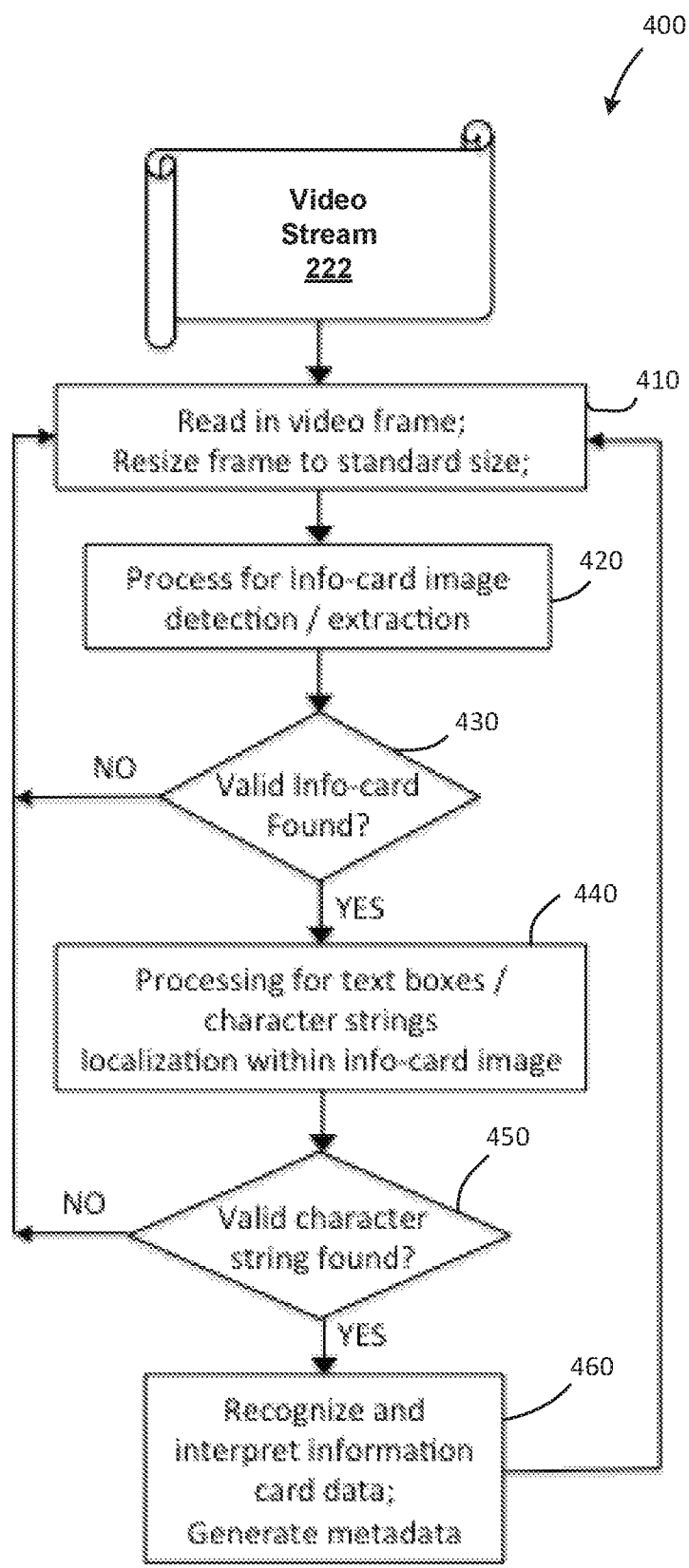
FIG. 4 is a flowchart depicting an overall application process for real-time receiving and processing of television programming content for in-frame information card localization and content extraction and rendering, according to one embodiment.

FIG. 4 is a flowchart depicting a method 400, according to one embodiment, carried out by an application running, for example, on one of client devices 106, and/or analytical servers 116, that receives a video stream 222 and performs on-the-fly processing of video frames 300 for extraction of metadata from card images such as 310. System 100 of FIG. 1A will be referenced as the system carrying out method 400 and those that follow; however, alternative systems, including but not limited to system 160 of FIG. 1B, system 180 of FIG. 1C, and/or system 190 of FIG. 1D, may be used in place of system 100 of FIG. 1A.

Method 400 of FIG. 4 depicts, in more detail, the process outlined above. A video stream, such as a video stream 222 corresponding to a highlight 220 that has been previously identified, may be received and decoded. In a step 410, one or more video frames 300 of video stream 222 may be received, resized to standard sizes, and decoded. In a step 420, a video frame 300 may be processed to detect and, if applicable, extract one or more card images, such as card image 310 of FIG. 3, from video frame 300. Pursuant to a query 430, if no valid card image 310 is found in video frame 300, method 400 may return to step 410 to decode and analyze a different video frame 300.

If a valid card image 310 has been found, then in a step 440, video frame 300 may be further processed to localize, extract, and process a detected card image 310 and extract and process text boxes and/or strings of characters embedded in card image 310. Pursuant to a query 450, if no valid character string 200 is found in card image 310, method 400 may return to step 410 to process a new video frame 300.

If a valid character string 200 is found in card image 310, method 400 may proceed to a step 460, in which extracted character string(s) 200 are recognized and interpreted, and corresponding metadata 224 is generated based on the interpretation of information from card image 310. In various embodiments, the available choices for text interpretation are based on determining the type of card image of card image 310 detected in video frame 300, and/or on advance knowledge of detected fields present within the particular type of card image applicable to card image 310 detected in video frame 300.

As indicated previously, detection, localization, and interpretation of embedded text in card images present in television programming content may occur entirely locally on the TV, on a STB, or on a mobile device. Alternatively, it can occur remotely on a remote video server with broadcast video ingestion and streaming capability. Alternatively, any combination of local and remote processing can be used.

Information Card Character Strings Processing: Localization and Extraction

An "Extremal Region" (ER) is an image region whose outer boundary pixels have strictly higher values than the region itself (e.g. L. Neumann, J. Matas, "Real-Time Scene Text Localization and Recognition", 5th IEEE Conference on Computer Vision and Pattern Recognition, Providence, RI, June 2012). One of the well-known methods used for ER detection in an image uses a so-called maximally stable ER detector, or MSER detector. Additional detection methods allow for testing of a wider range of ERs, while maintaining relatively low computational complexity. When a wider range of ERs are included in the test, a sequential classifier can be introduced which is based on certain features pertinent to the character regions. This classifier can be pre-trained to generate a probability of the presence of a character, which results in multiple probable detected boundaries of a character (i.e., character boundaries 204). While in the first stage of ER classification, the probability of the presence of a character is estimated; in the second stage, ERs with locally maximal probability are selected. The classification can be further improved by using some more computationally expensive features. Furthermore, in at least one embodiment, a repetitive exhaustive search is applied to detect combinations of characters and to group ERs into words. Such methods also allow for region edges to be included into the consideration of ERs for improved character detection. The final outcome is an ER selected with highest probability of representing character boundaries 204.

Since the character detector described above generates several regions for the same character, the next step is to disambiguate the detected regions. In at least one embodiment, this disambiguation involves performing multiple comparisons of detected character boundaries 204, and subsequently purging character boundaries 204, which may be in the form of character-bounding boxes, which appear too close to each other. As a result, only one character-bounding box is accepted within a certain perimeter, thus allowing for a correct formation of a character string 200 representing the appropriate text field of card image 310.

Figure 5:
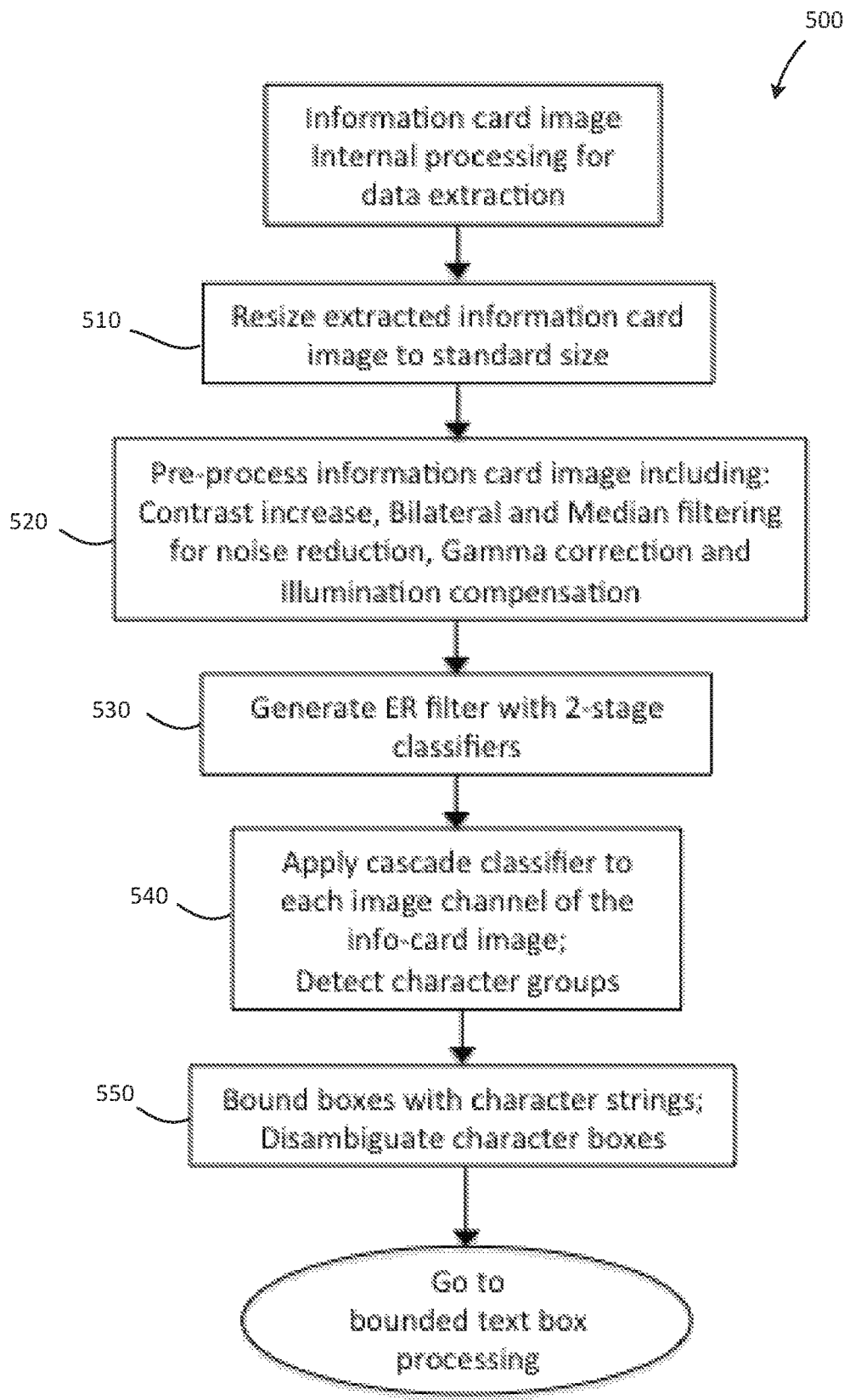
FIG. 5 is a flowchart depicting internal processing of a detected and extracted information card image for character string bounding box extraction, according to one embodiment.

FIG. 5 is a flowchart depicting a method 500 for carrying out, in more detail, the process outlined above. A video frame 300 is selected for processing, or an option is chosen to process each video frame 300 in succession. In a step 510, card images 310 in video frames 300, if any are detected, are extracted and resized to a standardized size. Next, in a step 520, the resized card images are pre-processed by a chain of filters, including for example: contrast increase, bilateral and median filtering for noise reduction, gamma correction, and/or illumination compensation.

In a step 530, an ER filter with 2-stage classifiers is created, and in a step 540, this cascade classifier is applied to each image channel of card image 310. Character groups are detected, and one or more groups of word boxes are extracted for further processing. In a step 550, character strings 200 with individual character boundaries 204 are analyzed for character boundary disambiguation. Finally, a clean character string 200 is generated, with only one character accepted within each of the perimeters of a location 206 of a character.

Figure 6:
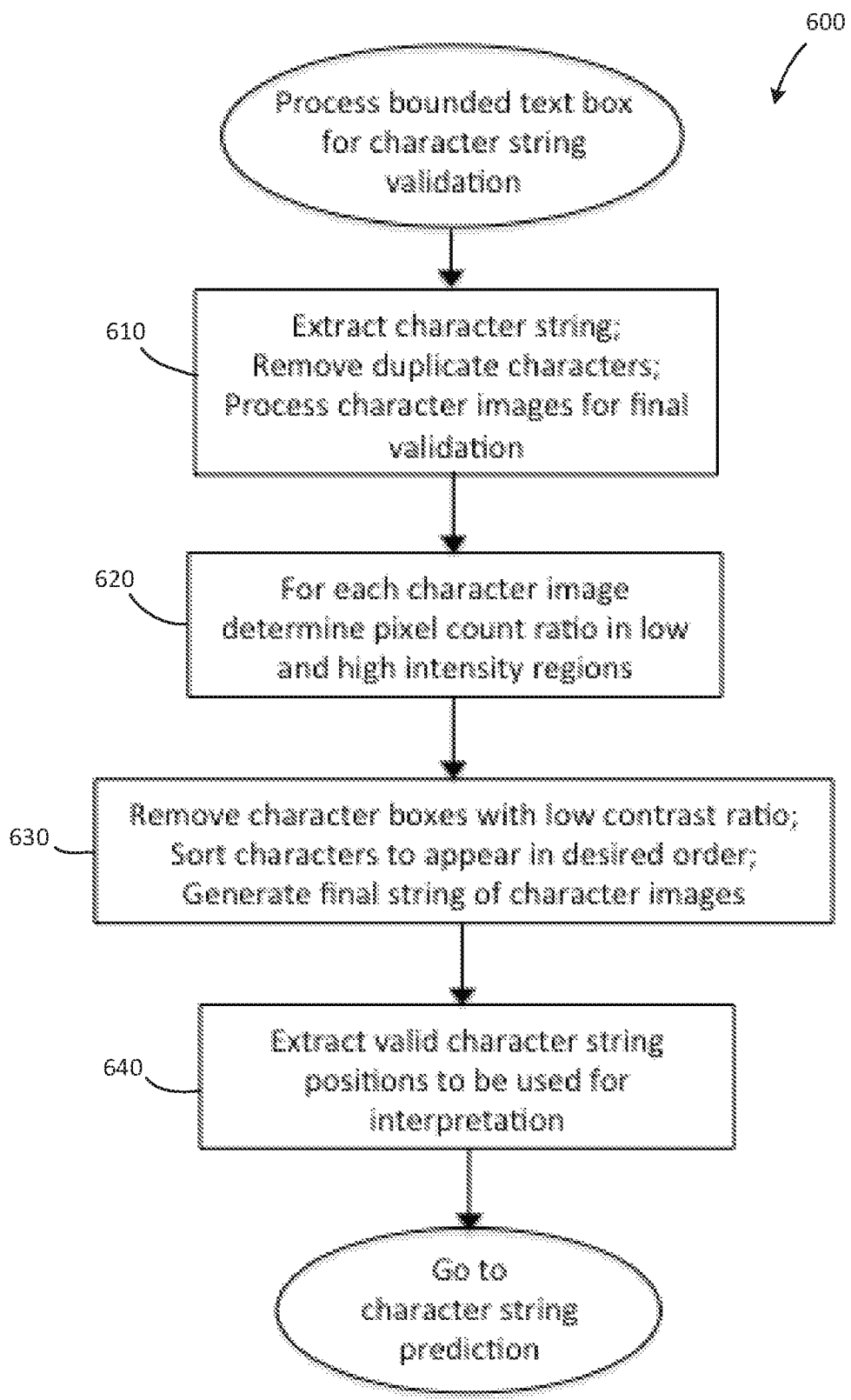
FIG. 6 is a flowchart depicting a method for processing text boxes for final bounded character images validation and associated positional parameters extraction, according to one embodiment.

FIG. 6 is a flowchart depicting a method 600 of further processing for validation of character boundaries 204. Method 600 may commence with extraction of character strings 200, removal of duplicate characters, and final processing and acceptance of character strings 200, in a step 610. As depicted, each character within the string of disambiguated characters may be further processed for character image validation.

Thus, in a step 620, pixel count ratios may be obtained in low and high intensity regions of each character image 202 (or processed character image 203), for comparison with a predefined contrast ratio between low- and high-intensity pixel counts. In step 620, for each character image 202 or processed character image 203, high- and low-intensity level pixels are grouped and counted.

Next, in a step 630, the ratio of these two counts is computed and subjected to thresholding, such that only character images 202 or processed character images 203 with sufficiently high contrast ratios are retained. Subsequently, in a step 640, positional bounding box coordinates (i.e., locations 206) for validated characters are recorded and saved for further use in interpretation of character strings 200.

In alternative embodiments, the character-bounding box validation described above may precede the character boundary disambiguation, or it may be used in combination with character boundary disambiguation for final character validation.

Information Card Processing for Query Extraction and Recognition

In at least one embodiment, an automated process is performed, including the steps of: receiving a digital video stream, such as video stream 222 pertaining to a highlight 220; analyzing one or more video frames 300 of the digital video stream for the presence of a card image 310; extracting card image 310; localizing character boundaries 204 for characters of character strings 200 within card image 310; and extracting text residing within the text boxes to create a query string of characters.

Figure 7:
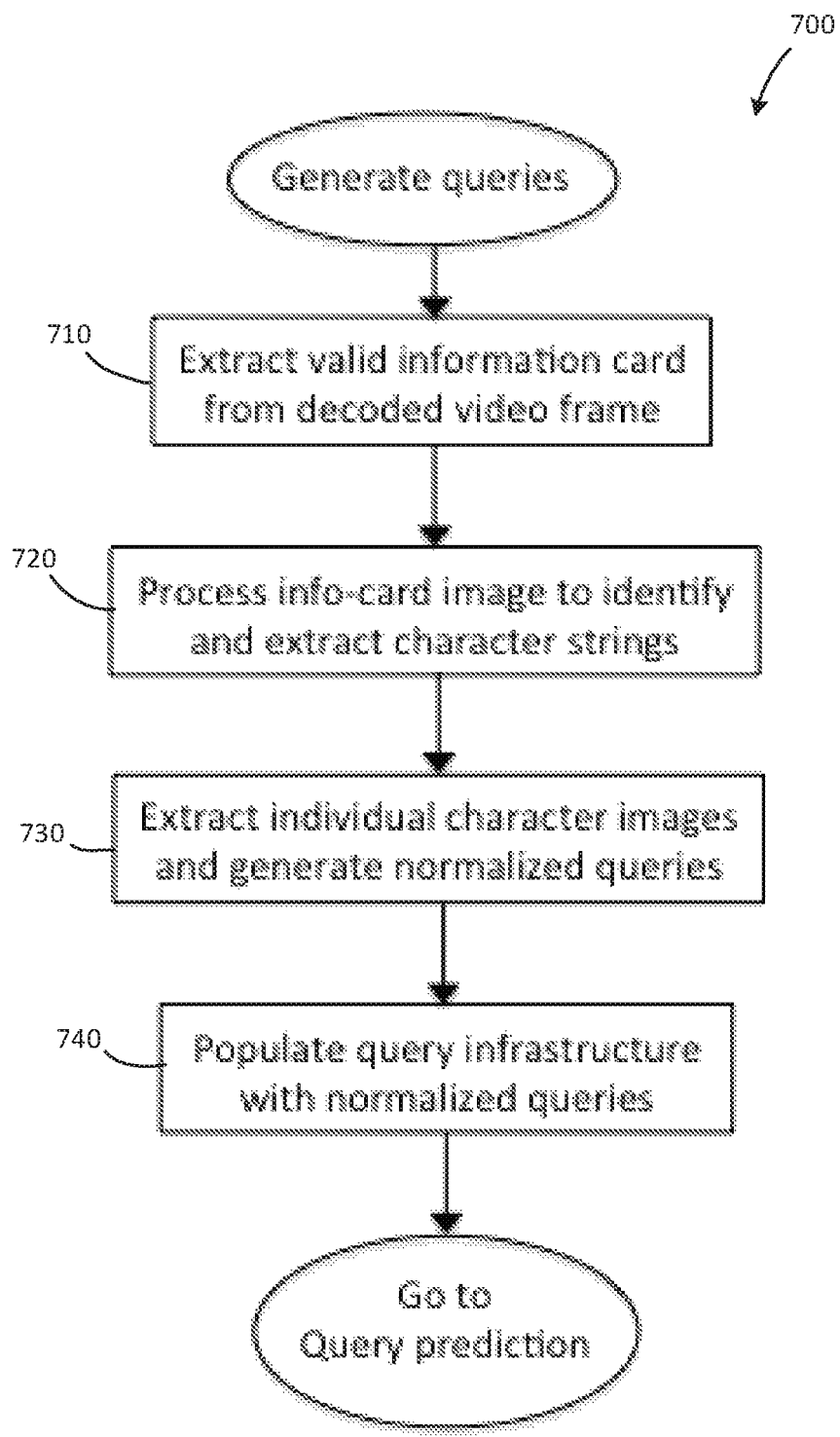
FIG. 7 is a flowchart depicting a method for query generation from embedded information card text images, according to one embodiment.

FIG. 7 is a flowchart depicting a method 700 of information card query generation according to one embodiment. In a step 710, card images 310 are extracted from decoded video frames 300. In a step 720, card images 310 are processed to identify and extract character strings 200 as described above. In a step 730, character images 202 are extracted from card images 310 and normalized query images (for example, queries 230), are generated. In a step 740, a query infrastructure is populated with normalized query character images (query feature vectors 232).

In another embodiment, query predictions are generated by first projecting query feature vectors onto a previously developed training set orthogonal basis (for example, orthogonal basis 234), and then applying the resulting projected query feature vectors to a machine-learned classification model, such as classification model 165. A string of predicted alphanumeric characters may be generated in accordance with previously established classification labels, and this predicted alphanumeric string may be passed to an interpretation process for final extraction of text meaning 238.

Figure 8:
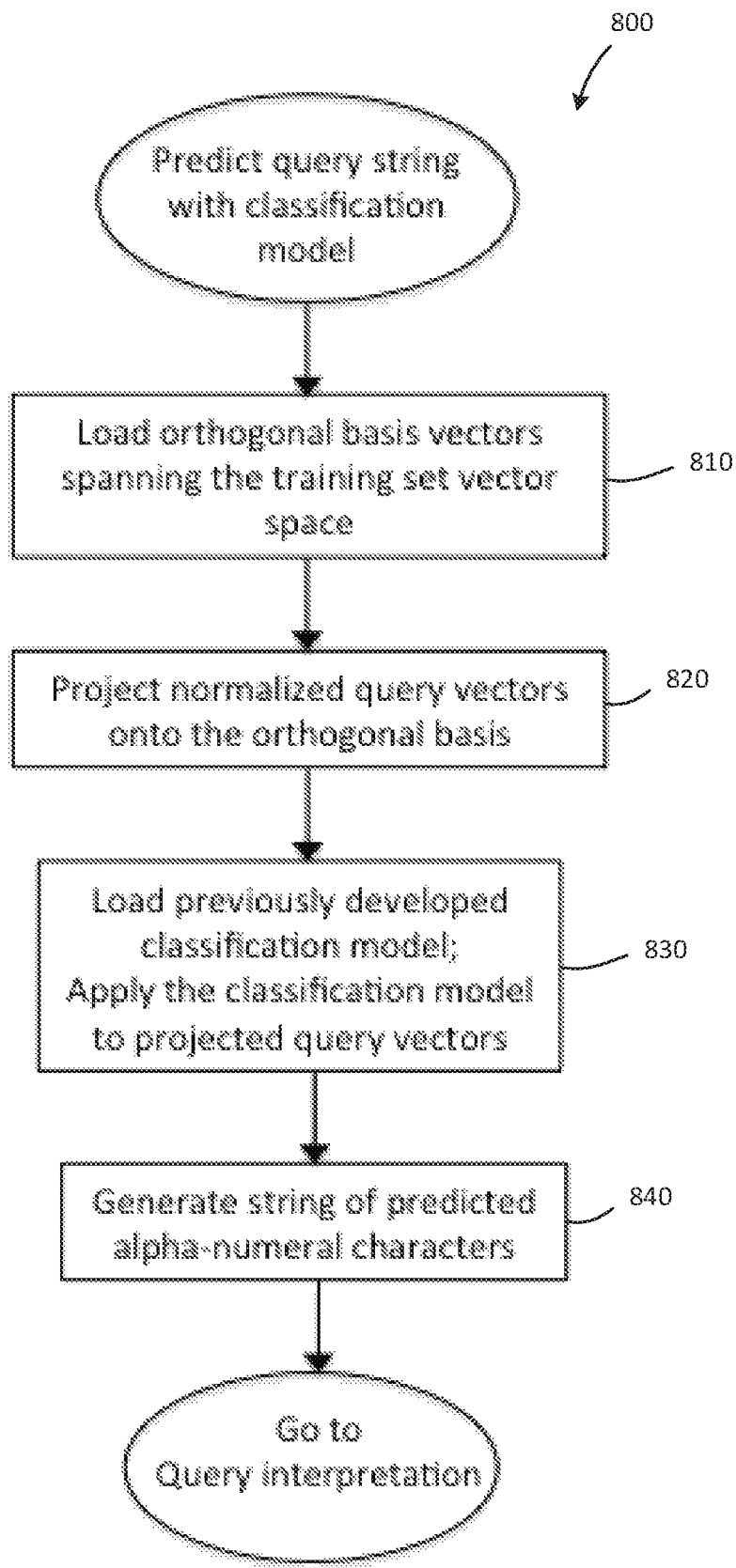
FIG. 8 is a flowchart depicting a method for generating predicted alphanumeric characters for extracted query character strings based on a machine-learned classification model, according to one embodiment.

FIG. 8 is a flowchart depicting a method 800 containing processing steps for query recognition, leading to query alphanumeric string generation and query interpretation and understanding. In a step 810, orthogonal basis vectors of orthogonal basis 234 are loaded, spanning the training set vector space. In a step 820, normalized queries may be projected onto orthogonal basis 234. In a step 830, classification model 165, as previously developed, may be loaded. Classification model 165 may be applied to projected queries. Finally, in a step 840, a string of predicted alphanumeric characters may be generated, and subsequently used for interpretation and meaning extraction to yield text meaning 238.

Query Interpretation and Meaning Extraction

In at least one embodiment, one or more character strings 200 residing within card image 310 are identified. Subsequent steps may include localization, size determination, and extraction of each character image 202 in identified character strings 200. Detected and extracted character images 202 are converted into query feature vectors 232 and projected onto training set orthogonal basis 234. Subsequently, the projected queries are applied against classification model 165, to produce a string of predicted alphanumeric characters.

In at least one embodiment, the predicted query alphanumeric characters are routed to an interpretation process that applies previous knowledge and positional understanding of characters residing in a multitude of card images 310. Next, the meaning is derived for each predicted alphanumeric character positioned in a particular character string 200, and the extracted information is appended to metadata 224 stored in association with highlight 220.

Figure 9:
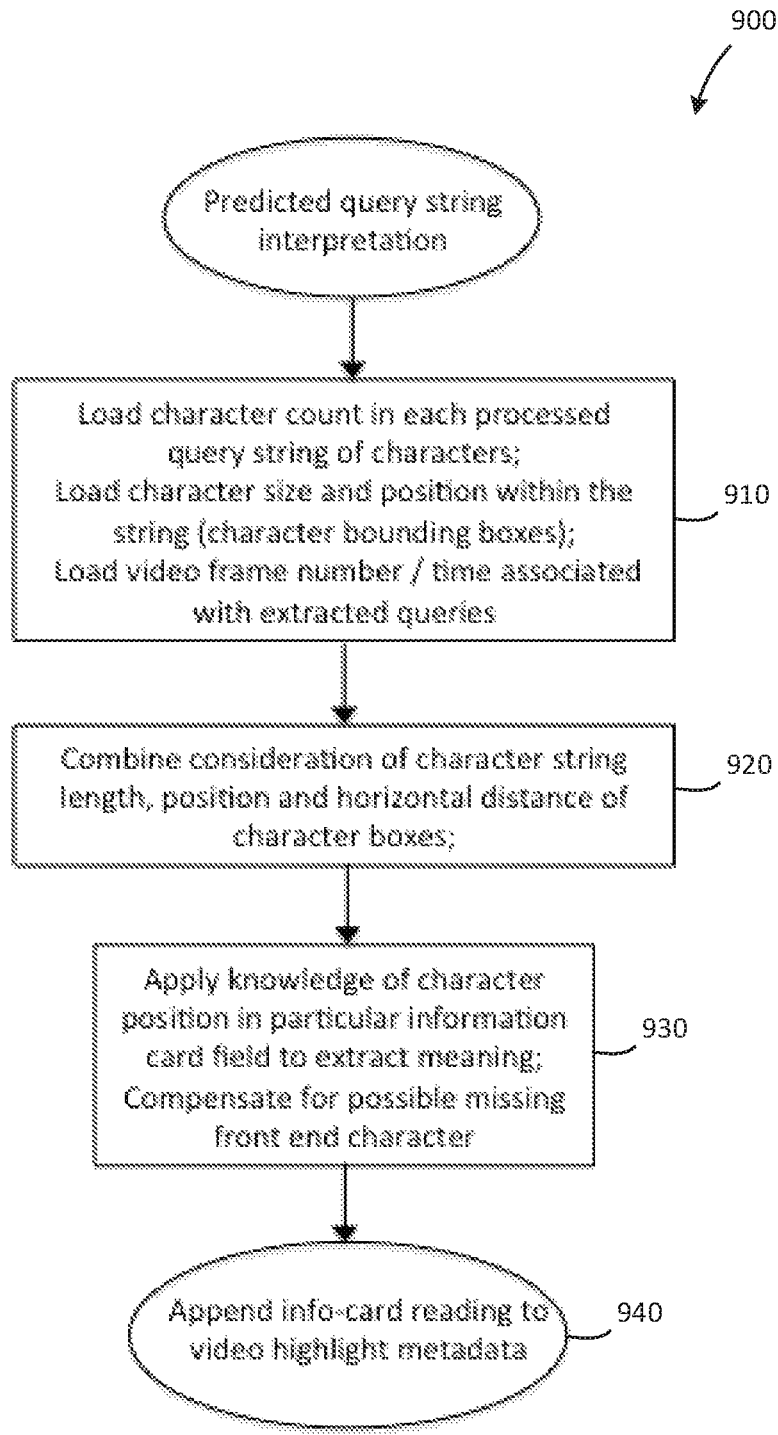
FIG. 9 is a flowchart depicting a method for predicted query alphanumeric string interpretation, according to one embodiment.

FIG. 9 is a flowchart depicting, in more detail, a method 900 for predicted query string interpretation according to one embodiment. Method 900 involves combining consideration of character string length, position and horizontal distance of character boxes, and alphanumeric readings for meaning extraction.

Method 900 starts with a step 910 in which a character count in each processed query for a character string 200 is loaded, together with size 205 and location 206 of the character within character string 200. The video frame number and/or time, associated with extracted queries 230 to be processed, may also be made available for a reference related to the absolute time. In a step 920, string length 209, size 205 of the characters, and/or location 206 of the characters may be considered in the analysis.

Next, in a step 930, system 100 may proceed through character string 200, and character string 200 may be interpreted by applying knowledge of field position of the characters, as well as the knowledge of alphanumeric values of the characters. In step 930, knowledge and understanding of particular card image 310 may also be used to compensate for possible missing front characters. Finally, in a step 940, the derived meaning is recorded (for example, in text meaning 238), and corresponding metadata 224 are formed, providing real-time information related to the current sporting event television programming and the current timeline associated with processed embedded card images 310.

Generation of Machine Learned Classification Model with Application to Recognition of Query Characters Extracted from Embedded Information Cards In at least one embodiment, classification model generation is performed using convolutional neural networks. In general, neural networks develop their information categorization capabilities through a supervised learning process applied to a training set of character vectors, and with a known (desired) classification outcome. During the training process, the neural network algorithmic structure adjusts its weights and biases to perform accurate classification. One example of a known architecture used for learning internal weights and biases of a neural network during the training process, is a back-propagation neural network architecture, or feed-forward back-propagation neural network architecture. When such a network is presented with a set of training data, the back-propagation algorithm computes the difference between the actual output and desired output, and feeds back the error to correct the inner network weights and biases that are responsible for error generation. At the classification/inference phase, a neural network structure is first loaded with pre-learned model parameters, weights, and biases, and then a query is fed forward through the network, resulting in one or more identified label(s) at the network output representing query prediction.

In another exemplary system for classification model generation, a multi-class SVM is used. Such SVM classification systems differ radically from comparable approaches such as neural network learning systems, which rely heavily on heuristics to construct various network architectures, and with training processes that do not always end in a global minimum. In contrast, SVMs are mathematically very well defined, and with a training process that consistently finds a global minimum. In addition, with SVMs, there is a relatively simple and clear geometric interpretation of the training process and classification goals, which improve on the intuitive insight into the process of classification model generation. An SVM can be efficiently utilized for classification of data sets that are not linearly separable, and can be extended to multi-label classification tasks. The SVM for classification of data sets that are not linearly separable is characterized by the choice of kernel functions, which help project the data set onto a high-dimensional vector space, where the original data sets become linearly separable. However, the choice of kernel functions is non-trivial, and includes a degree of heuristics and data dependency.

In at least one embodiment, character classification model generation is based on a training set of characters extracted from one or more exemplary card images 310 embedded in sporting event television programming contents. Character boundaries 204 are detected and characters are extracted from a multitude of card images 310. Such character boundaries 204 contain small character images 202 that may be subsequently normalized to a standard size and illumination to provide processed character images 203. Feature vectors (or query feature vectors 232) are formed for character images 202 and/or processed character images 203, and these feature vectors are then associated with each particular character from a set of character images appearing in embedded card images 310.

In a structural approach to a character image feature formation, a character feature vector, or query feature vector 232, is associated with a set of n pixels extracted from a preprocessed character image 202. These n pixels are formatted into an n-dimensional vector, representing a single point in the n-dimensional feature vector space of training vectors. The main goal of feature selection is to construct a decision boundary in feature space that correctly separates character images 202 of different classes. Hence, in at least one embodiment, the extracted set of character images 202, representing the training vectors, are further processed to increase uniqueness and mutual metric distance of training vectors, as well as to reduce the dimensionality of the overall vector space of training vectors.

In accordance with the above considerations, in another embodiment, a principal component analysis (PCA) is performed on the training vector set. Thus, orthogonal basis vectors of orthogonal basis 234 are derived from the training set, such that the orthogonal basis vectors are spanning the training vector space. In addition, the dimensionality of the training vector space is reduced by selecting a limited number of orthogonal basis vectors such that only the most important orthogonal vectors, associated with the largest set of singular values (generated by singular value decomposition of the matrix of training vectors) are retained. The selected training set basis vectors are saved for later use in classification model generation with one or more of available algorithmic structures for data set classification, such as an SVM classifier or a CNN classifier.

In various embodiments, the systems and methods described herein provide techniques for extracting individual character images 202 from character strings 200 embedded in card images 310, and for subsequent utilization of character images 202 to generate query feature vectors 232. In the next processing step, these query feature vectors are projected onto orthogonal basis 234 spanning the training vector space to generate projected queries. Projected queries are subsequently applied to generate query predictions, or predicted queries 236, as an output of the pre-trained classification model produced by the exemplary SVM (or CNN) classifier. These predicted queries 236 form a string of predicted characters, which is subsequently interpreted to generate text meaning 238, and finally used to generate metadata 224 for highlights 220, enriched with real-time information read directly from card images 310.

Figure 10:
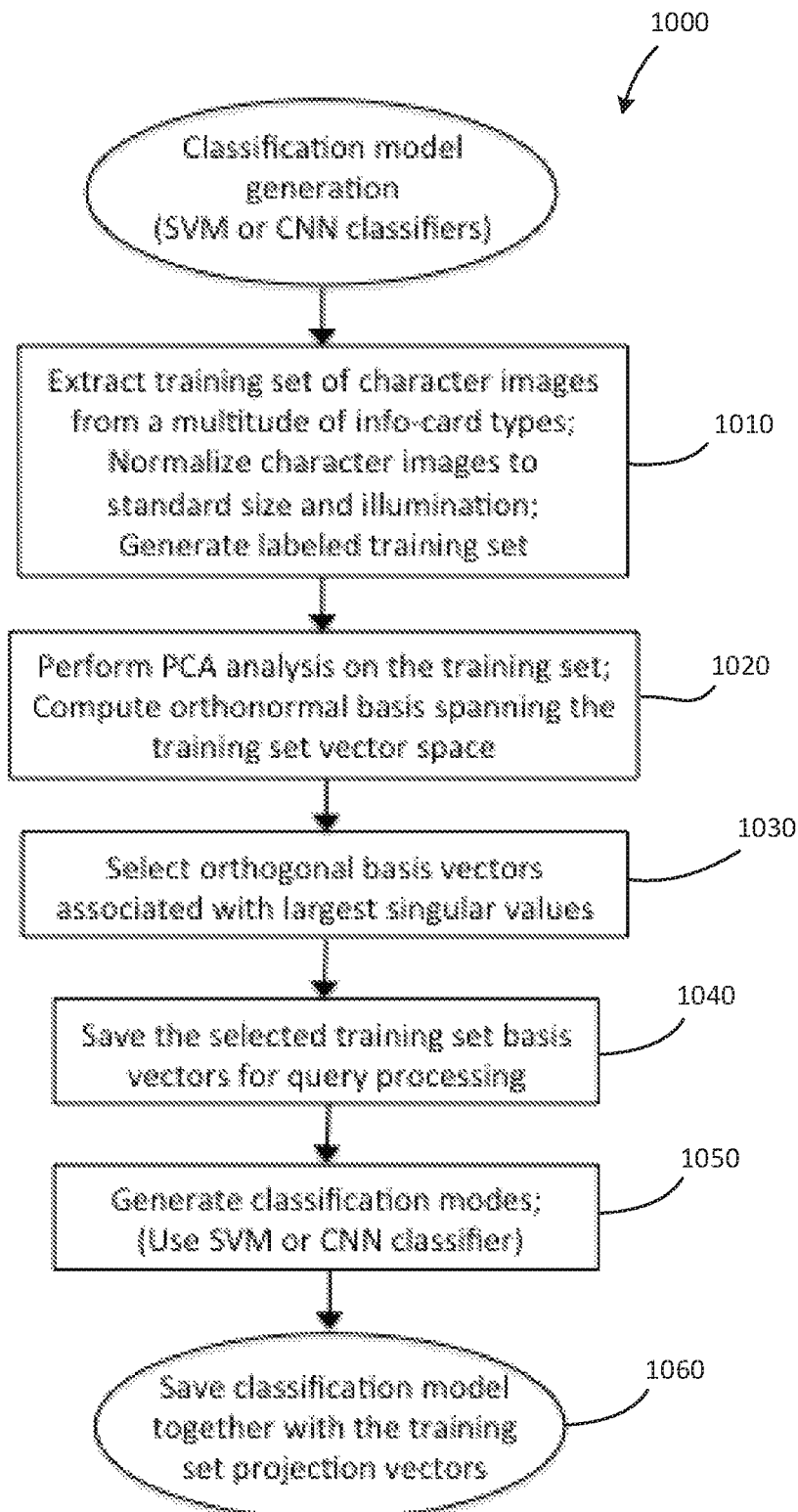
FIG. 10 is a flowchart depicting preprocessing of training set vectors and subsequent classification model generation based on a multi-class SVM classifier or a CNN classifier, according to one embodiment.

FIG. 10 is a flowchart depicting, in more detail, a method 1000 of classification model generation. In at least one embodiment, method 1000 commences with a step 1010 in which an exemplary training set of character images 202 is extracted from a multitude of exemplary card image types. Character images 202 are normalized to a standard size and illumination to form processed character images 203. Feature vectors are derived, and a labeled training set is generated. In at least one embodiment, in a step 1020, PCA analysis is performed on the training set by computing orthogonal basis 234 spanning the training vector space. In a step 1030, a subset of orthogonal training vectors is selected. The selected training set basis vectors may be saved for query processing in a step 1040. In a step 1050, classification model 165 may be trained with the subset of orthogonal training vectors. The classification model and the orthogonal basis vectors may be saved, in a step 1060, for generation of future predicted queries 236.

Figure 11:
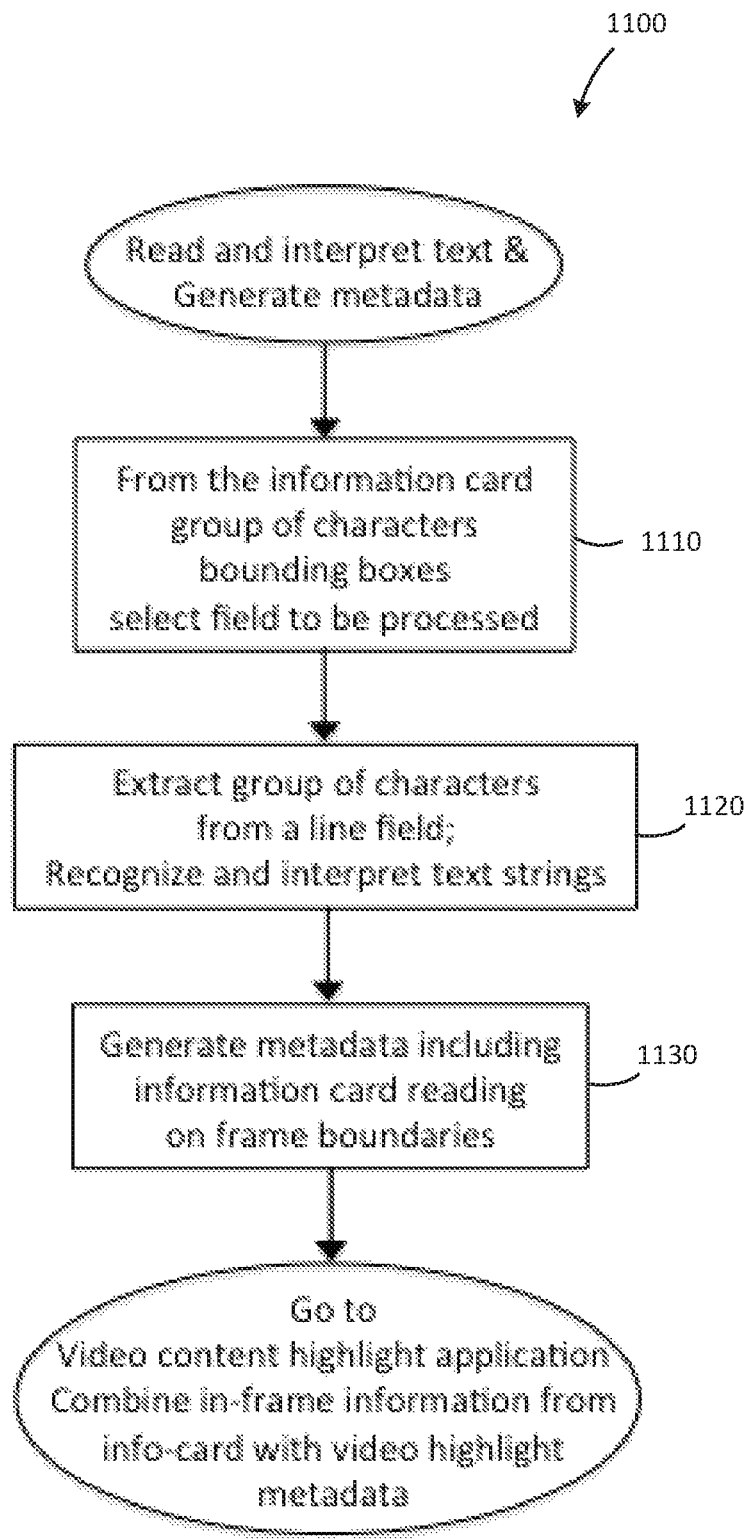
FIG. 11 is a flowchart depicting an overall process of reading and interpreting text fields in information cards, and updating video highlight metadata with in-frame real-time information, according to one embodiment.

FIG. 11 is a flowchart depicting an overall method 1100 of reading and interpreting text fields in cards images 310, and updating metadata 224 for highlights 220 with in-frame real-time information. In a step 1110, a field to be processed is selected from character boundaries 204 of the characters present in card image 310. In a step 1120, a group of characters is extracted from a line field, and text strings are recognized and interpreted as described above. Finally, in a step 1130, the card image reading performed on decoded video frame boundaries is embedded in metadata 224 generated for highlight 220.

The present system and method have been described in particular detail with respect to possible embodiments. Those of skill in the art will appreciate that the system and method may be practiced in other embodiments. First, the particular naming of the components, capitalization of terms, the attributes, data structures, or any other programming or structural aspect is not mandatory or significant, and the mechanisms and/or features may have different names, formats, or protocols. Further, the system may be implemented via a combination of hardware and software, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

Reference in the specification to "one embodiment" or to "an embodiment" means that a particular feature, structure, or characteristic, described in connection with the embodiments, is included in at least one embodiment. The appearances of the phrases "in one embodiment" or "in at least one embodiment" in various places in the specification are not necessarily all referring to the same embodiment.

Various embodiments may include any number of systems and/or methods for performing the above-described techniques, either singly or in any combination. Another embodiment includes a computer program product comprising a non-transitory computer-readable storage medium and computer program code, encoded on the medium, for causing a processor in a computing device or other electronic device to perform the above-described techniques.

Some portions of the above are presented in terms of algorithms and symbolic representations of operations on data bits within the memory of a computing device. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects include process steps and instructions described herein in the form of an algorithm. It should be noted that the process steps and instructions can be embodied in software, firmware and/or hardware, and when embodied in software, can be downloaded to reside on, and be operated from, different platforms used by a variety of operating systems.

The present document also relates to an apparatus for performing the operations herein. This apparatus may be specially constructed for the required purposes, or it may comprise a general-purpose computing device selectively activated or reconfigured by a computer program stored in the computing device. Such a computer program may be stored in a computer readable storage medium, such as, but is not limited to, any type of disk, including floppy disks, optical disks, CD-ROMs, DVD-ROMs, magnetic-optical disks, read-only memories (ROMs), random access memories (RAMs), EPROMs, EEPROMs, flash memory, solid state drives, magnetic or optical cards, application specific integrated circuits (ASICs), or any type of media suitable for storing electronic instructions, and each coupled to a computer system bus. The program and its associated data may also be hosted and run remotely, for example on a server. Further, the computing devices referred to herein may include a single processor or may be architectures employing multiple processor designs for increased computing capability.

The algorithms and displays presented herein are not inherently related to any particular computing device, virtualized system, or other apparatus. Various general-purpose systems may also be used with programs in accordance with the teachings herein, or it may prove convenient to construct a more specialized apparatus to perform the required method steps. The required structure for a variety of these systems will be apparent from the description provided herein. In addition, the system and method are not described with reference to any particular programming language. It will be appreciated that a variety of programming languages may be used to implement the teachings described herein, and any references above to specific languages are provided for disclosure of enablement and best mode.

Accordingly, various embodiments include software, hardware, and/or other elements for controlling a computer system, computing device, or other electronic device, or any combination or plurality thereof. Such an electronic device may include, for example, a processor, an input device such as a keyboard, mouse, touchpad, track pad, joystick, trackball, microphone, and/or any combination thereof, an output device such as a screen, speaker, and/or the like, memory, long-term storage such as magnetic storage, optical storage, and/or the like, and/or network connectivity. Such an electronic device may be portable or non-portable. Examples of electronic devices that may be used for implementing the described system and method include: a desktop computer, laptop computer, television, smartphone, tablet, music player, audio device, kiosk, set-top box, game system, wearable device, consumer electronic device, server computer, and/or the like. An electronic device may use any operating system such as, for example and without limitation: Linux; Microsoft Windows, available from Microsoft Corporation of Redmond, Washington; Mac OS X, available from Apple Inc. of Cupertino, California; iOS, available from Apple Inc. of Cupertino, California; Android, available from Google, Inc. of Mountain View, California; and/or any other operating system that is adapted for use on the device.

While a limited number of embodiments have been described herein, those skilled in the art, having benefit of the above description, will appreciate that other embodiments may be devised. In addition, it should be noted that the language used in the specification has been principally selected for readability and instructional purposes, and may not have been selected to delineate or circumscribe the subject matter. Accordingly, the disclosure is intended to be illustrative, but not limiting, of scope.

What is claimed is:

1. A method for generating a classification model for extracting metadata from a video stream, the method comprising: receiving, by a computing system, at least a portion of a video stream; identifying, by the computing system, one or more card images embedded in one or more video frames of the portion of the video stream; processing, by the computing system, the one or more card images to extract a plurality of character images, each character image comprising a character; generating, by the computing system, a training set of character vectors in a vector space based on the extracted plurality of character images, wherein generating the training set of the character vectors in the vector space based on the extracted plurality of character images includes: formatting, by the computing system, a set of n pixels from the plurality of character images into n-dimensional vectors; reducing, by the computing system, dimensionality of the vector space by selecting a subset of the character vectors in the training set; and generating, by the computing system, a classification model to extract metadata from video streams by training the classification model using at least one of the subset of the character vectors.

2. The method of claim 1, further comprising:
   normalizing, by the computing system, the plurality of character images to a standard size and/or a standard illumination prior to generating the training set of the character vectors.

3. The method of claim 1, wherein reducing the dimensionality of the vector space by selecting the subset of the character vectors further comprises:

performing, by the computing system, a principal component analysis on the training set of the character vectors to determine character vectors that are orthogonal basis vectors; and selecting, by the computing system, the orthogonal basis vectors as the subset of the character vectors.

4. The method of claim 1, wherein reducing the dimensionality of the vector space by selecting the subset of the character vectors further comprises:

performing, by the computing system, a principal component analysis on the training set of the character vectors to determine character vectors that are orthogonal basis vectors; and selecting, by the computing system, a limited number of the orthogonal basis vectors as the subset of the character vectors.

5. The method of claim 4, wherein selecting the limited number of the orthogonal basis vectors further comprises:

selecting, by the computing system, orthogonal basis vectors that correspond to a largest set of singular values derived from a matrix of the orthogonal basis vectors.

6. The method of claim 1, wherein the video stream is of a sporting event, and wherein the one or more card images include at least one of:

a current time within the sporting event;
a current phase of the sporting event;
a game clock of the sporting event; or
a game score of the sporting event.

7. The method of claim 1, wherein the classification model is at least one of a support vector model or a convolutional neural network.

8. A system for generating a classification model for extracting metadata from a video stream, the system comprising: a non-transitory storage medium storing computer program instructions; and at least one processor configured to execute the computer program instructions to perform operations comprising: receiving at least a portion of a video stream; identifying one or more card images embedded in one or more video frames of the portion of the video stream; processing the one or more card images to extract a plurality of character images, each character image comprising a character; generating a training set of character vectors in a vector space based on the extracted plurality of character images, wherein generating the training set of the character vectors in the vector space based on the extracted plurality of character images includes: formatting, by the computing system, a set of n pixels from the plurality of character images into n-dimensional vectors; reducing dimensionality of the vector space by selecting a subset of the character vectors in the training set; and generating a classification model to extract metadata from video streams by training the classification model using at least one of the subset of the character vectors.

9. The system of claim 8, wherein the operations further comprise:

normalizing the plurality of character images to a standard size and/or a standard illumination prior to generating the training set of the character vectors.

10. The system of claim 8, wherein reducing the dimensionality of the vector space by selecting the subset of the character vectors further comprises:

performing a principal component analysis on the training set of the character vectors to determine character vectors that are orthogonal basis vectors; and selecting the orthogonal basis vectors as the subset of the character vectors.

11. The system of claim 8, wherein reducing the dimensionality of the vector space by selecting the subset of the character vectors further comprises:

performing a principal component analysis on the training set of the character vectors to determine character vectors that are orthogonal basis vectors; and selecting a limited number of the orthogonal basis vectors as the subset of the character vectors.

12. The system of claim 11, wherein selecting the limited number of the orthogonal basis vectors further comprises:

selecting orthogonal basis vectors that correspond to a largest set of singular values derived from a matrix of the orthogonal basis vectors.

13. The system of claim 8, wherein the video stream is of a sporting event, and wherein the one or more card images include at least one of:

a current time within the sporting event;
a current phase of the sporting event;
a game clock of the sporting event; or
a game score of the sporting event.

14. A non-transitory storage medium storing computer program instructions that when executed by at least one processor perform operations comprising: receiving at least a portion of a video stream; identifying one or more card images embedded in one or more video frames of the portion of the video stream; processing the one or more card images to extract a plurality of character images, each character image comprising a character; generating a training set of character vectors in a vector space based on the extracted plurality of character images, wherein generating the training set of the character vectors in the vector space based on the extracted plurality of character images includes: formatting, by the computing system, a set of n pixels from the plurality of character images into n-dimensional vectors; reducing dimensionality of the vector space by selecting a subset of the character vectors in the training set; and generating a classification model to extract metadata from video streams by training the classification model using at least one of the subset of the character vectors.

15. The non-transitory storage medium of claim 14, wherein the operations further comprise:

normalizing the plurality of character images to a standard size and/or a standard illumination prior to generating the training set of the character vectors.

16. The non-transitory storage medium of claim 14, wherein reducing the dimensionality of the vector space by selecting the subset of the character vectors further comprises:

performing a principal component analysis on the training set of the character vectors to determine character vectors that are orthogonal basis vectors; and selecting the orthogonal basis vectors as the subset of the character vectors.

17. The non-transitory storage medium of claim 14, wherein reducing the dimensionality of the vector space by selecting the subset of the character vectors further comprises:

performing a principal component analysis on the training set of the character vectors to determine character vectors that are orthogonal basis vectors; and selecting a limited number of the orthogonal basis vectors as the subset of the character vectors.

* * * * *